United States Patent
Sapugay et al.

(10) Patent No.: US 12,380,277 B2
(45) Date of Patent: Aug. 5, 2025

(54) WRITTEN-MODALITY PROSODY SUBSYSTEM IN A NATURAL LANGUAGE UNDERSTANDING (NLU) FRAMEWORK

(71) Applicant: ServiceNow, Inc., Santa Clara, CA (US)

(72) Inventors: Edwin Sapugay, Foster City, CA (US); Anil Kumar Madamala, Sunnyvale, CA (US); Maxim Naboka, Santa Clara, CA (US); Srinivas Satyasai Sunkara, Sunnyvale, CA (US); Lewis Savio Landry Santos, Santa Clara, CA (US); Murali B. Subbarao, Saratoga, CA (US)

(73) Assignee: ServiceNow, Inc., Santa Clara, CA (US)

(*) Notice: Subject to any disclaimer, the term of this patent is extended or adjusted under 35 U.S.C. 154(b) by 553 days.

(21) Appl. No.: 17/453,446

(22) Filed: Nov. 3, 2021

(65) Prior Publication Data

US 2022/0058343 A1  Feb. 24, 2022

Related U.S. Application Data

(63) Continuation of application No. 16/298,764, filed on Mar. 11, 2019, now Pat. No. 11,238,232.

(Continued)

(51) Int. Cl.
*G06F 40/30* (2020.01)
*G06F 40/205* (2020.01)

(Continued)

(52) U.S. Cl.
CPC ............ *G06F 40/30* (2020.01); *G06F 40/205* (2020.01); *G06F 40/211* (2020.01); *G06N 5/022* (2013.01);

(Continued)

(58) Field of Classification Search
CPC .... G06F 40/211; G06F 40/253; G06F 40/268; G06F 40/284; G06F 40/30; G10L 15/00; G10L 15/26
See application file for complete search history.

(56) References Cited

U.S. PATENT DOCUMENTS 6,064,963 A * 5/2000 Gainsboro .............. G10L 15/26
704/274
6,609,122 B1  8/2003 Ensor (Continued)

*Primary Examiner* — Lamont M Spooner
(74) *Attorney, Agent, or Firm* — FLETCHER YODER PC

(57) ABSTRACT

Present embodiment include a prosody subsystem of a natural language understanding (NLU) framework that is designed to analyze collections of written messages for various prosodic cues to break down the collection into a suitable level of granularity (e.g., into episodes, sessions, segments, utterances, and/or intent segments) for consumption by other components of the NLU framework, enabling operation of the NLU framework. These prosodic cues may include, for example, source prosodic cues that are based on the author and the conversation channel associated with each message, temporal prosodic cues that are based on a respective time associated with each message, and/or written prosodic cues that are based on the content of each message. For example, to improve the domain specificity of the agent automation system, intent segments extracted by the prosody subsystem may be consumed by a training process for a ML-based structure subsystem of the NLU framework.

20 Claims, 17 Drawing Sheets

Related U.S. Application Data

(60) Provisional application No. 62/659,710, filed on Apr. 19, 2018, provisional application No. 62/657,751, filed on Apr. 14, 2018, provisional application No. 62/652,903, filed on Apr. 5, 2018, provisional application No. 62/646,917, filed on Mar. 23, 2018, provisional application No. 62/646,915, filed on Mar. 23, 2018, provisional application No. 62/646,916, filed on Mar. 23, 2018.

(51) Int. Cl.
*G06F 40/211* (2020.01)
*G06N 5/022* (2023.01)
*G06N 20/00* (2019.01)
*G10L 15/19* (2013.01)
*G10L 15/22* (2006.01)
*G10L 15/16* (2006.01)
*G10L 15/18* (2013.01)

(52) U.S. Cl.
CPC ............. *G06N 20/00* (2019.01); *G10L 15/19* (2013.01); *G10L 15/22* (2013.01); *G10L 15/16* (2013.01); *G10L 15/1807* (2013.01); *G10L 15/1822* (2013.01); *G10L 2015/223* (2013.01); *G10L 2015/225* (2013.01)

(56) References Cited

U.S. PATENT DOCUMENTS

| | | |
|---|---|---|
| 6,816,898 B1 | 11/2004 | Scarpelli |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,509,653 B2 | 3/2009 | Das et al. |
| 7,610,191 B2 * | 10/2009 | Gao ...................... G06F 40/268 704/7 |
| 7,610,512 B2 | 10/2009 | Gerber |
| 7,617,073 B2 | 11/2009 | Trinon |
| 7,617,500 B2 | 11/2009 | Astl et al. |
| 7,630,784 B2 | 12/2009 | Hunt et al. |
| 7,653,650 B2 | 1/2010 | Kulkarni et al. |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,849,201 B1 | 12/2010 | Subbarao et al. |
| 7,890,802 B2 | 2/2011 | Gerber |
| 7,925,981 B2 | 4/2011 | Pourheidari |
| 7,930,396 B2 | 4/2011 | Trinon |
| 8,006,240 B2 | 4/2011 | Bhatkhande et al. |
| 7,945,860 B2 | 5/2011 | Vambenepe |
| 7,958,031 B2 | 6/2011 | Hunt et al. |
| 7,966,398 B2 | 6/2011 | Wiles |
| 7,971,147 B2 | 6/2011 | Subbarao et al. |
| 8,041,589 B1 * | 10/2011 | Blair ...................... G06Q 10/06 705/7.11 |
| 8,051,164 B2 | 11/2011 | Peuter |
| 8,112,354 B2 | 2/2012 | Lalwani et al. |
| 8,156,479 B2 | 4/2012 | Fong et al. |
| 8,224,683 B2 | 7/2012 | Manos |
| 8,266,683 B2 | 9/2012 | Navarrete |
| 8,402,127 B2 | 3/2013 | Solin |
| 8,433,654 B2 | 4/2013 | Subbarao et al. |
| 8,457,928 B2 | 6/2013 | Dang |
| 8,473,361 B2 | 6/2013 | Subbarao et al. |
| 8,478,569 B2 | 7/2013 | Scarpelli |
| 8,498,872 B2 * | 7/2013 | White ...................... G10L 15/30 704/270.1 |
| 8,612,289 B2 | 12/2013 | Subbarao et al. |
| 8,612,408 B2 | 12/2013 | Trinon |
| 8,650,078 B2 | 2/2014 | Subbarao et al. |
| 8,674,992 B2 | 3/2014 | Poston |
| 8,688,453 B1 * | 4/2014 | Joshi ...................... G10L 15/00 707/738 |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,047,283 B1 * | 6/2015 | Zhang ................ G06F 16/3346 |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,626,717 B2 | 4/2017 | Sapugay et al. |
| 9,633,004 B2 | 4/2017 | Giuli et al. |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 10,236,017 B1 * | 3/2019 | Witt-Ehsani ............ G06F 40/35 |
| 10,375,237 B1 * | 8/2019 | Williams ............. H04L 67/568 |
| 10,943,583 B1 * | 3/2021 | Gandhe ................ G10L 15/183 |
| 11,080,483 B1 * | 8/2021 | Islam ...................... G06F 16/35 |
| 11,238,232 B2 * | 2/2022 | Sapugay ............... G06N 20/00 |
| 2006/0130038 A1 | 6/2006 | Claussen et al. |
| 2007/0071206 A1 * | 3/2007 | Gainsboro ........ H04M 3/42221 379/168 |
| 2007/0261065 A1 | 11/2007 | Astl et al. |
| 2008/0075444 A1 | 3/2008 | Sapugay et al. |
| 2010/0104086 A1 * | 4/2010 | Park ........................ H04M 3/51 379/265.09 |
| 2012/0173632 A1 * | 7/2012 | Chakra ................ G06Q 10/107 709/206 |
| 2012/0246073 A1 | 9/2012 | Gore et al. |
| 2012/0290938 A1 | 11/2012 | Subbarao et al. |
| 2013/0151624 A1 * | 6/2013 | Bhogal ................ G06Q 10/103 709/205 |
| 2013/0212342 A1 * | 8/2013 | Mccullough ........ G06F 12/0246 711/E12.002 |
| 2013/0273976 A1 * | 10/2013 | Rao ...................... H04L 12/1822 455/563 |
| 2013/0282483 A1 * | 10/2013 | Ruarte ............... G06Q 30/0255 705/14.49 |
| 2014/0028780 A1 * | 1/2014 | Croen .................... H04N 7/147 348/14.03 |
| 2014/0047049 A1 * | 2/2014 | Poston ................ H04L 12/1822 709/206 |
| 2014/0279274 A1 | 9/2014 | Subbarao et al. |
| 2014/0297457 A1 | 10/2014 | Sapugay et al. |
| 2014/0297458 A1 | 10/2014 | Sapugay et al. |
| 2014/0359029 A1 * | 12/2014 | Jagadish ............... G06F 16/328 709/206 |
| 2015/0095290 A1 * | 4/2015 | Saliba .................. G06F 11/1402 707/674 |
| 2015/0269573 A1 | 9/2015 | Subbarao et al. |
| 2015/0346955 A1 * | 12/2015 | Fundament ........ H04N 21/4821 715/765 |
| 2016/0070693 A1 * | 3/2016 | Carrier ................ G06F 16/3329 707/755 |
| 2016/0142363 A1 * | 5/2016 | Hong .................... G06F 9/5083 709/206 |
| 2016/0217515 A1 * | 7/2016 | Vijayaraghavan ........................ G06Q 30/0201 |
| 2017/0048170 A1 * | 2/2017 | Smullen .................. H04L 67/02 |
| 2017/0062010 A1 * | 3/2017 | Pappu .................. G11B 27/105 |
| 2017/0160813 A1 * | 6/2017 | Divakaran ............ G06N 3/006 |
| 2017/0206465 A1 * | 7/2017 | Jin ...................... G06F 16/5866 |
| 2017/0344889 A1 * | 11/2017 | Sengupta ............ G06Q 50/01 |
| 2018/0095940 A1 * | 4/2018 | Meixner ................ H04L 51/046 |
| 2018/0239822 A1 * | 8/2018 | Reshef .................... G06F 40/35 |
| 2018/0260680 A1 * | 9/2018 | Finkelstein ............. G06N 5/04 |
| 2018/0270277 A1 * | 9/2018 | Blanchard ........... H04L 12/1822 |

(56) References Cited

U.S. PATENT DOCUMENTS

| | | | | |
|---|---|---|---|---|
| 2018/0357221 A1* | 12/2018 | Galitsky | ............... | G06F 40/289 |
| 2018/0357310 A1* | 12/2018 | Eidem | ................. | H04L 63/0457 |
| 2018/0365228 A1* | 12/2018 | Galitsky | ................. | G06F 40/35 |
| 2019/0080683 A1* | 3/2019 | Qian | ................... | G10L 15/1815 |
| 2019/0103092 A1* | 4/2019 | Rusak | .................... | G06N 3/045 |
| 2019/0108270 A1* | 4/2019 | Dunne | .................... | G06N 5/01 |
| 2019/0236140 A1* | 8/2019 | Canim | .................... | G06F 40/30 |
| 2019/0332919 A1* | 10/2019 | Weiss | .................... | G06N 3/045 |

\* cited by examiner

WRITTEN-MODALITY PROSODY SUBSYSTEM IN A NATURAL LANGUAGE UNDERSTANDING (NLU) FRAMEWORK

CROSS-REFERENCE

This application is a continuation of U.S. patent application Ser. No. 16/298,764, entitled "WRITTEN-MODALITY PROSODY SUBSYSTEM IN A NATURAL LANGUAGE UNDERSTANDING (NLU) FRAMEWORK," filed Mar. 11, 2019, which claims priority from and the benefit of U.S. Provisional Application No. 62/646,915, entitled "HYBRID LEARNING SYSTEM FOR NATURAL LANGUAGE UNDERSTANDING," filed Mar. 23, 2018; U.S. Provisional Application No. 62/646,916, entitled "VOCABULARY MANAGEMENT IN A NATURAL LEARNING FRAMEWORK," filed Mar. 23, 2018; U.S. Provisional Application No. 62/646,917, entitled "METHOD AND SYSTEM FOR AUTOMATED INTENT MINING, CLASSIFICATION AND DISPOSITION," filed Mar. 23, 2018; U.S. Provisional Application No. 62/657,751, entitled "METHOD AND SYSTEM FOR FOCUSED CONVERSATION CONTEXT MANAGEMENT IN A BEHAVIOR ENGINE," filed Apr. 14, 2018; U.S. Provisional Application No. 62/652,903, entitled "TEMPLATED RULE-BASED DATA AUGMENTATION FOR INTENT EXTRACTION FROM SPARSE DATA," filed Apr. 5, 2018; and U.S. Provisional Application No. 62/659,710, entitled "WRITTEN-MODALITY PROSODY SUBSYSTEM IN A NLU FRAMEWORK," filed Apr. 19, 2018, which are incorporated by reference herein in their entirety for all purposes. This application is also related to co-pending U.S. patent application Ser. No. 16/238,324 and Ser. No. 16/238,331, entitled, "HYBRID LEARNING SYSTEM FOR NATURAL LANGUAGE UNDERSTANDING," filed Jan. 2, 2019; U.S. patent application Ser. No. 16/179,681, entitled, "METHOD AND SYSTEM FOR AUTOMATED INTENT MINING, CLASSIFICATION AND DISPOSITION," filed Nov. 2, 2018; U.S. patent application Ser. No. 16/239,147, entitled, "SYSTEM FOR FOCUSED CONVERSATION CONTEXT MANAGEMENT IN A REASONING AGENT/BEHAVIOR ENGINE OF AN AGENT AUTOMATION SYSTEM," filed Jan. 3, 2019; and U.S. patent application Ser. No. 16/239,218, entitled, "TEMPLATED RULE-BASED DATA AUGMENTATION FOR INTENT EXTRACTION," filed Jan. 3, 2019, which are also incorporated by reference herein in their entirety for all purposes.

BACKGROUND

The present disclosure relates generally to the fields of natural language understanding (NLU) and artificial intelligence (AI), and more specifically, to a hybrid learning system for NLU.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations and these resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Such a cloud computing service may host a virtual agent, such as a chat agent, that is designed to automatically respond to issues with the client instance based on natural language requests from a user of the client instance. For example, a user may provide a request to a virtual agent for assistance with a password issue, wherein the virtual agent is part of a Natural Language Processing (NLP) or Natural Language Understanding (NLU) system. NLP is a general area of computer science and AI that involves some form of processing of natural language input. Examples of areas addressed by NLP include language translation, speech generation, parse tree extraction, part-of-speech identification, and others. NLU is a sub-area of NLP that specifically focuses on understanding user utterances. Examples of areas addressed by NLU include question-answering (e.g., reading comprehension questions), article summarization, and others. For example, a NLU may use algorithms to reduce human language (e.g., spoken or written) into a set of known symbols for consumption by a downstream virtual agent. NLP is generally used to interpret free text for further analysis. Current approaches to NLP are typically based on deep learning, which is a type of AI that examines and uses patterns in data to improve the understanding of a program.

However, existing virtual agents applying NLU techniques may fail to properly derive meaning from complex natural language utterances. For example, present approaches may fail to comprehend complex language and/or relevant context in a request. Further, existing approaches may not be suitable for or capable of customization and may not be adaptable to various communication channels and styles.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to an agent automation framework that is capable of extracting meaning from user utterances, such as requests received by a virtual agent (e.g., a chat agent), and suitably responding to these user utterances. To do this, the agent automation framework includes a NLU framework and an intent/entity model having defined intents and entities that are associated with sample utterances. The NLU framework includes a meaning extraction subsystem that is designed to generate meaning representations for the sample utterances of the intent/entity model, as well as a meaning representation for a received user utterance. Additionally, the disclosed NLU framework includes a meaning search subsystem that is designed to search the meaning representations of the intent/entity model to locate matches for a meaning representation of a received user utterance. As such, present embodiments generally address the hard problem posed by NLU by transforming it into a manageable search problem.

More specifically, present embodiments are directed to a prosody subsystem of the NLU framework that is designed to analyze collections of written messages for various prosodic cues to break down the collection into a suitable level of granularity (e.g., into sessions, segments, utterances, and/or intent segments) for consumption by other components of the NLU framework, thereby enabling operation of the NLU framework. It should be noted that, while prosody and prosodic cues are generally associated with spoken language, it is presently recognized that certain prosodic cues can be identified in different written language communication channels (e.g., chat rooms, forums, email exchanges), and these prosodic cues provide insight into how the written conversation should be digested into useful inputs for the NLU framework. These prosodic cues may include, for example, source prosodic cues that are based on the author and the conversation channel associated with each message, temporal prosodic cues that are based on a respective time associated with each message, and/or written prosodic cues that are based on the content of each message. For example, intent segments extracted by the prosody subsystem may be consumed by a training process for a machine learning (ML)-based structure subsystem of the NLU framework. Contextually-relevant groups of utterances extracted by the prosody subsystem may be consumed by another training process that generates new word vector distribution models for a vocabulary subsystem of the NLU framework. Intent segments extracted by the prosody subsystem may be consumed by a semantic mining framework of the NLU framework to generate an intent/entity model that is used for intent extraction. Episodes extracted by the prosody subsystem may be consumed by a reasoning agent/behavior engine (RA/BE) to generate episodic context information. Additionally, to enable episodic context management within the NLU framework, the prosody subsystem may also analyze a user message for prosodic cues and provide an indication as to whether the user message corresponds to a prior episodes or corresponds to a new episode.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
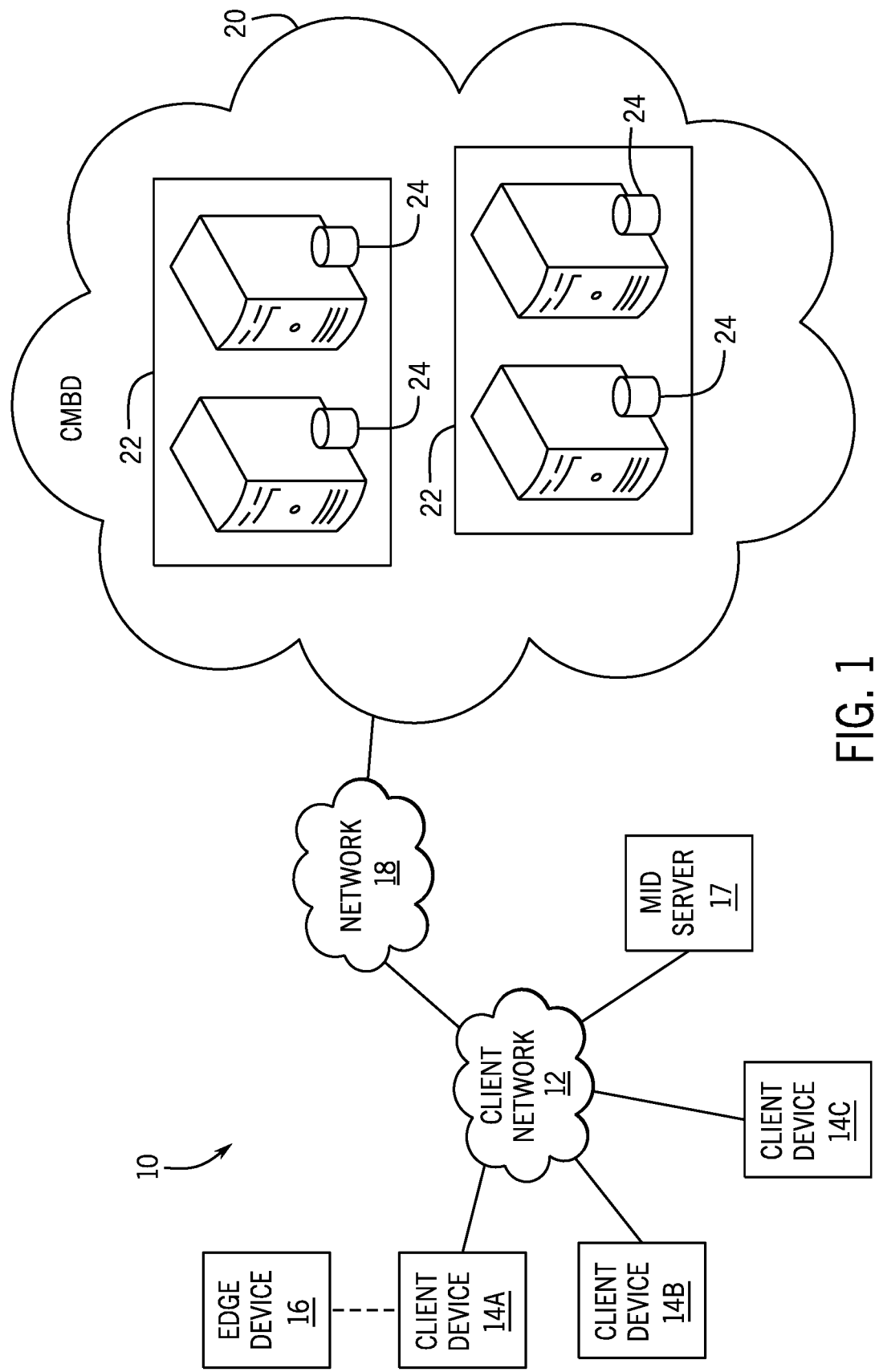
FIG. 1 is a block diagram of an embodiment of a cloud computing system in which embodiments of the present technique may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" or "computing device" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "machine-readable medium" may include a single medium or multiple media (e.g., a centralized or distributed database, and/or associated caches and servers) that store one or more instructions or data structures. The term "non-transitory machine-readable medium" shall also be taken to include any tangible medium that is capable of storing, encoding, or carrying instructions for execution by the computing system and that cause the computing system to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

As used herein, the terms "application" and "engine" refer to one or more sets of computer software instructions (e.g., computer programs and/or scripts) executable by one or more processors of a computing system to provide particular functionality. Computer software instructions can be written in any suitable programming languages, such as C, C++, C#, Pascal, Fortran, Perl, MATLAB, SAS, SPSS, JavaScript, AJAX, and JAVA. Such computer software instructions can comprise an independent application with data input and data display modules. Alternatively, the disclosed computer software instructions can be classes that are instantiated as distributed objects. The disclosed computer software instructions can also be component software, for example JAVABEANS or ENTERPRISE JAVABEANS. Additionally, the disclosed applications or engines can be implemented in computer software, computer hardware, or a combination thereof.

As used herein, the term "framework" refers to a system of applications and/or engines, as well as any other supporting data structures, libraries, modules, and any other supporting functionality, that cooperate to perform one or more overall functions. In particular, a "natural language understanding framework" or "NLU framework" comprises a collection of computer programs designed to process and derive meaning (e.g., intents, entities) from natural language utterances based on an intent/entity model. As used herein, a "reasoning agent/behavior engine" or "RA/BE" refers to a rule-based agent, such as a virtual agent, designed to interact with users based on a conversation model. For example, a "virtual agent" may refer to a particular example of a RA/BE that is designed to interact with users via natural language requests in a particular conversational or communication channel. With this in mind, the terms "virtual agent" and "RA/BE" are used interchangeably herein. By way of specific example, a virtual agent may be or include a chat agent that interacts with users via natural language requests and responses in a chat room environment. Other examples of virtual agents may include an email agent, a forum agent, a ticketing agent, a telephone call agent, and so forth, which interact with users in the context of email, forum posts, and autoreplies to service tickets, phone calls, and so forth.

As used herein, an "intent" refers to a desire or goal of an agent which may relate to an underlying purpose of a communication, such as an utterance. As used herein, an "entity" refers to an object, subject, or some other parameterization of an intent. It is noted that, for present embodiments, entities are treated as parameters of a corresponding intent. More specifically, certain entities (e.g., time and location) may be globally recognized and extracted for all intents, while other entities are intent-specific (e.g., merchandise entities associated with purchase intents) and are generally extracted only when found within the intents that define them. As used herein, an "intent/entity model" refers to an intent model that associates particular intents with particular sample utterances, wherein certain entity data may be encoded as a parameter of the intent within the model. As used herein, the term "agents" may refer to computer-generated personas (e.g. chat agents or other virtual agents) that interact with one another within a conversational channel. As used herein, a "corpus" refers to a captured body of source data that includes interactions between various users and virtual agents, wherein the interactions include communications or conversations within one or more suitable types of media (e.g., a help line, a chat room or message string, an email string).

As used herein, "source data" or "conversation logs" may include any suitable captured interactions between various agents, including but not limited to, chat logs, email strings, documents, help documentation, frequently asked questions (FAQs), forum entries, items in support ticketing, recordings of help line calls, and so forth. As used herein, an "utterance" refers to a single natural language statement made by a user or agent that may include one or more intents. As such, an utterance may be part of a previously captured corpus of source data, and an utterance may also be a new statement received from a user as part of an interaction with a virtual agent. As used herein, "machine learning" or "ML" may be used to refer to any suitable statistical form of artificial intelligence capable of being trained using machine learning techniques, including supervised, unsupervised, and semi-supervised learning techniques. For example, in certain embodiments, ML techniques may be implemented using a neural network (NN) (e.g., a deep neural network (DNN), a recurrent neural network (RNN), a recursive neural network). As used herein, a "vector" (e.g., a word vector, an intent vector, a subject vector, a subtree vector) refers to a linear algebra vector that is an ordered n-dimensional list (e.g., a 300 dimensional list) of floating point values (e.g., a 1×N or an N×1 matrix) that provides a mathematical representation of the semantic meaning of a portion (e.g., a word or phrase, an intent, an entity) of an utterance.

As used herein, the terms "dialog" and "conversation" refer to an exchange of utterances between a user and a virtual agent over a period of time (e.g., a day, a week, a month, a year, etc.). As used herein, an "episode" refers to distinct portions of dialog that may be delineated from one another based on a change in topic, a substantial delay between communications, or other factors. As used herein, "context" refers to information associated with an episode of a conversation that can be used by the RA/BE to determine suitable actions in response to extracted intents/entities of a user utterance. For embodiments discussed below, context information is stored as a hierarchical set of parameters (e.g., name/value pairs) that are associated with a frame of an episode of a dialog, wherein "hierarchical" means that a value of a parameter may itself be another set of parameters (e.g., a set of name/value pairs). As used herein, "domain specificity" refers to how attuned a system is to correctly extracting intents and entities expressed actual conversations in a given domain and/or conversational channel.

As mentioned, a computing platform may include a chat agent, or another similar virtual agent, that is designed to automatically respond to user requests to perform functions or address issues on the platform. There are two predominant technologies in NLU, namely traditional computational linguistics and newer machine learning (ML) methods. It is presently recognized that these two technologies demonstrate different strengths and weaknesses with respect to NLU. For example, traditional computational linguistic methods, also referred to herein as "rule-based" methods, include precision rule-sets and manually-crafted ontologies that enable precise adjudication of linguistic structure and semantic understanding to derive meaning representations. Traditional cognitive linguistic techniques also include the concept of construction grammars, in which an aspect of the meaning of a natural language utterance can be determined based on the form (e.g., syntactic structure) of the utterance. Therefore, rule-based methods offer results that are easily explainable and customizable. However, it is presently recognized that such rule-based methods are not particularly robust to natural language variation or adept at adapting to language evolution. As such, it is recognized that rule-based methods alone are unable to effectively react to (e.g., adjust to, learn from) data-driven trends, such as learning from chat logs and other data repositories. Furthermore, rule-based methods involve the creation of hand-crafted rules that can be cumbersome, wherein these rules usually are domain specific and are not easily transferable to other domains.

On the other hand, ML-based methods, perform well (e.g., better than rule-based methods) when a large corpus of natural language data is available for analysis and training. The ML-based methods have the ability to automatically "learn" from the data presented to recall over "similar" input. Unlike rule-based methods, ML-based methods do not involve cumbersome hand-crafted features-engineering, and ML-based methods can support continued learning (e.g., entrenchment). However, it is recognized that ML-based methods struggle to be effective when the size of the corpus is insufficient. Additionally, ML-based methods are opaque (e.g., not easily explained) and are subject to biases in source data. Furthermore, while an exceedingly large corpus may be beneficial for ML training, source data may be subject to privacy considerations that run counter to the desired data aggregation.

When attempting to derive user intent in a written modality or medium (e.g., in chat logs, dynamic conversations, user forums, or other databases where user communication is stored) it is presently recognized that collections of documents and utterances should be suitably segmented into pieces that are consumable by particular downstream NLP tasks. In order to do so, it is presently recognized that a NLU framework should include a prosody component that takes cues from these stored documents to decompose these documents into differing levels of granularity, in which the level of granularity is dictated by the task at hand. For instance, in certain embodiments, the prosody subsystem is capable of decomposing individual utterances into segments that express granular intents (e.g., intent segments). These intent segments may then be individually matched with an NLU framework's meaning representation model and sequentially consumed by a RA/BE to act upon. In certain embodiments, the prosody subsystem is capable of decomposing long-lived conversations into episodes in order to allow the RA/BE to determine the appropriate context information that should be applied when acting in response to a user utterance. For instance, a conversation that occurred yesterday will most likely have a completely different context than a conversation happening today, whereas a conversation that occurred five minutes ago will most likely have a bearing on a conversation happening now. It is presently recognized that the delineation of context applicability has a substantial impact on reference resolution during processing of user requests by the RA/BE. Furthermore, in certain embodiments, the prosody subsystem is capable of decomposing conversations into segments that are useful in training ML-based components of the NLU framework. For instance, the prosody subsystem may provide pieces of conversations (e.g., intent segments, utterances in context) that are useful for performing statistical analyses of word context for generation of semantic vectors, as well as for other learning/training endeavors within the NLU framework.

Accordingly, present embodiments are generally directed toward an agent automation framework capable of applying a combination rule-based and ML-based cognitive linguistic techniques to leverage the strengths of both techniques in extracting meaning from natural language utterances. More specifically, present embodiments are directed to a prosody subsystem of the NLU framework that is designed to analyze collections of written messages for various prosodic cues to break down the collection into a suitable level of granularity (e.g., into episodes, sessions, segments, utterances, and/or intent segments) for consumption by other components of the NLU framework, enabling operation of the NLU framework. These prosodic cues may include, for example, source prosodic cues that are based on the author and the conversation channel associated with each message, temporal prosodic cues that are based on a respective time associated with each message, and/or written prosodic cues that are based on the content of each message. For example, as discussed below, in certain embodiments, intent segments extracted by the prosody subsystem may be consumed by a training process for a ML-based structure subsystem of the NLU framework. In certain embodiments, contextually-relevant groups of utterances extracted by the prosody subsystem may be consumed by another training process that generates new word vector distribution models for a vocabulary subsystem of the NLU framework. In certain embodiments, intent segments extracted by the prosody subsystem may be consumed by a semantic mining framework of the NLU framework to generate an intent/entity model that is used for intent extraction. In certain embodiments, episodes extracted by the prosody subsystem may be consumed by a reasoning agent/behavior engine (RA/BE) to generate episodic context information. In certain embodiments, to enable episodic context management, the prosody subsystem is also designed analyze a user message and, based on the extracted episodes, provide an indication as to whether the user message corresponds to a previous episodes or corresponds to a new episode.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 18 (e.g., the Internet), and a cloud-based platform 20. In some implementations, the cloud-based platform 20 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14 may be computing systems and/or other types of computing devices generally referred to as Internet of Things (IoT) devices that access cloud computing services, for example, via a web browser application or via an edge device 16 that may act as a gateway between the client devices 14 and the platform 20. FIG. 1 also illustrates that the client network 12 includes an administration or managerial device, agent, or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14 via the client network 12 and network 18. The network hosting the platform 20 provides additional computing resources to the client devices 14 and/or the client network 12. For example, by utilizing the network hosting the platform 20, users of the client devices 14 are able to build and execute applications for various enterprise, IT, and/or other organization-related functions. In one embodiment, the network hosting the platform 20 is implemented on the one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server 24 can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers 22 with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 24 and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
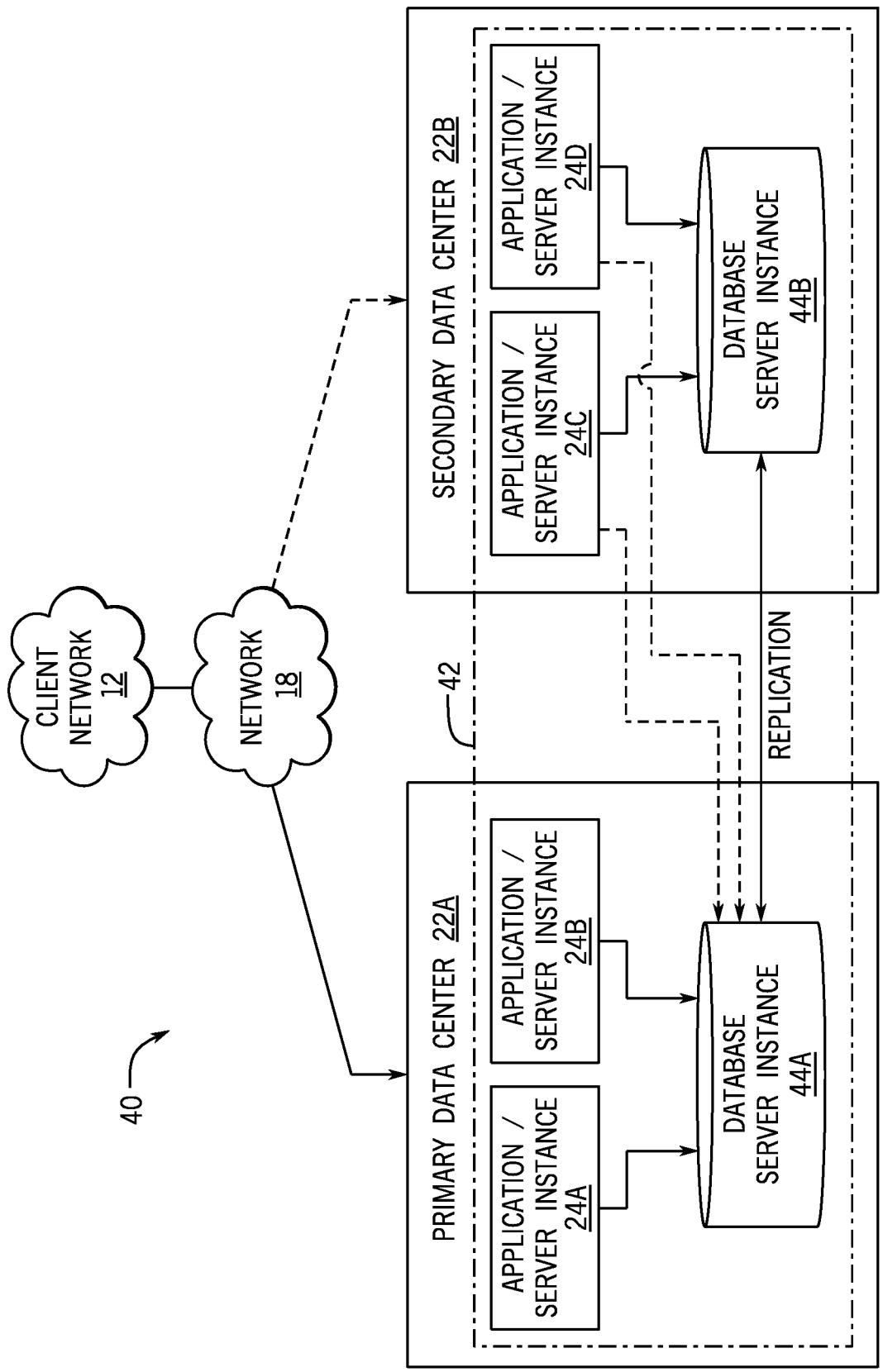
FIG. 2 is a block diagram of an embodiment of a multi-instance cloud architecture in which embodiments of the present technique may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. In the depicted example, to facilitate availability of the client instance 42, the virtual servers 24A-24D and virtual database servers 44A and 44B are allocated to two different data centers 22A and 22B so that one of the data centers 22 acts as a backup data center. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A, 24B, 24C, 24D and virtual database servers 44A, 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
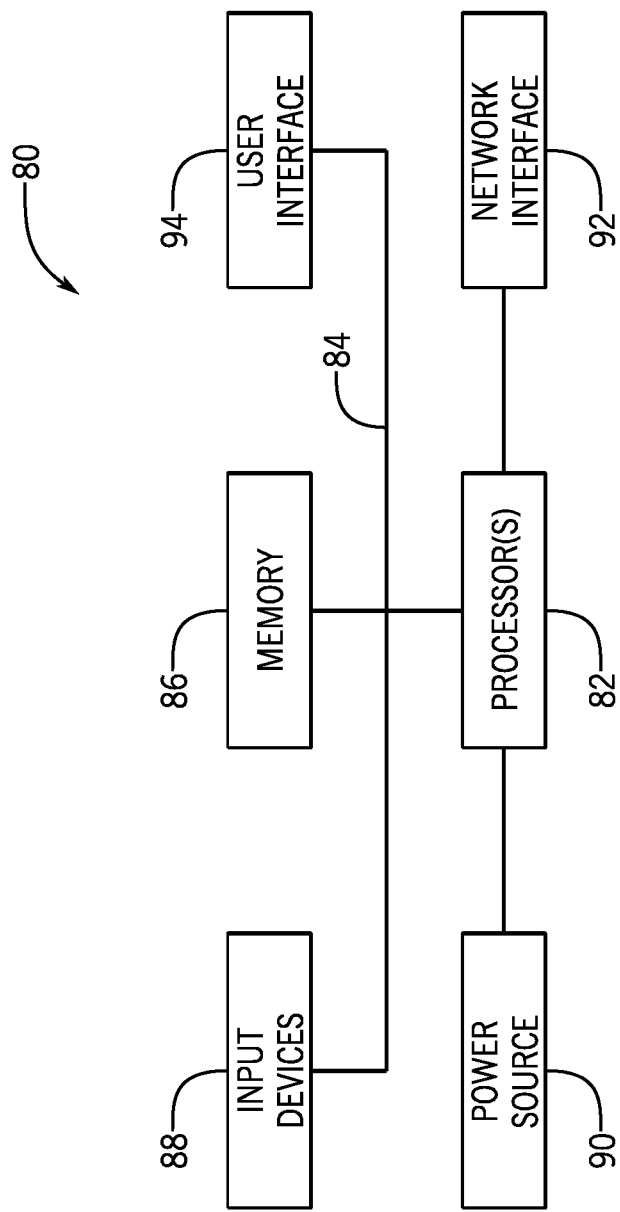
FIG. 3 is a block diagram of a computing device utilized in a computing system that may be present in FIG. 1 or 2, in accordance with aspects of the present technique.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 include suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processors 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

It should be appreciated that the cloud-based platform 20 discussed above provides an example of an architecture that may utilize NLU technologies. In particular, the cloud-based platform 20 may include or store a large corpus of source data that can be mined, to facilitate the generation of a number of outputs, including an intent/entity model. For example, the cloud-based platform 20 may include ticketing source data having requests for changes or repairs to particular systems, dialog between the requester and a service technician or an administrator attempting to address an issue, a description of how the ticket was eventually resolved, and so forth. Then, the generated intent/entity model can serve as a basis for classifying intents in future requests, and can be used to generate and improve a conversational model to support a virtual agent that can automatically address future issues within the cloud-based platform 20 based on natural language requests from users. As such, in certain embodiments described herein, the disclosed agent automation framework is incorporated into the cloud-based platform 20, while in other embodiments, the agent automation framework may be hosted and executed (separately from the cloud-based platform 20) by a suitable system that is communicatively coupled to the cloud-based platform 20 to process utterances, as discussed below.

Figure 4A:
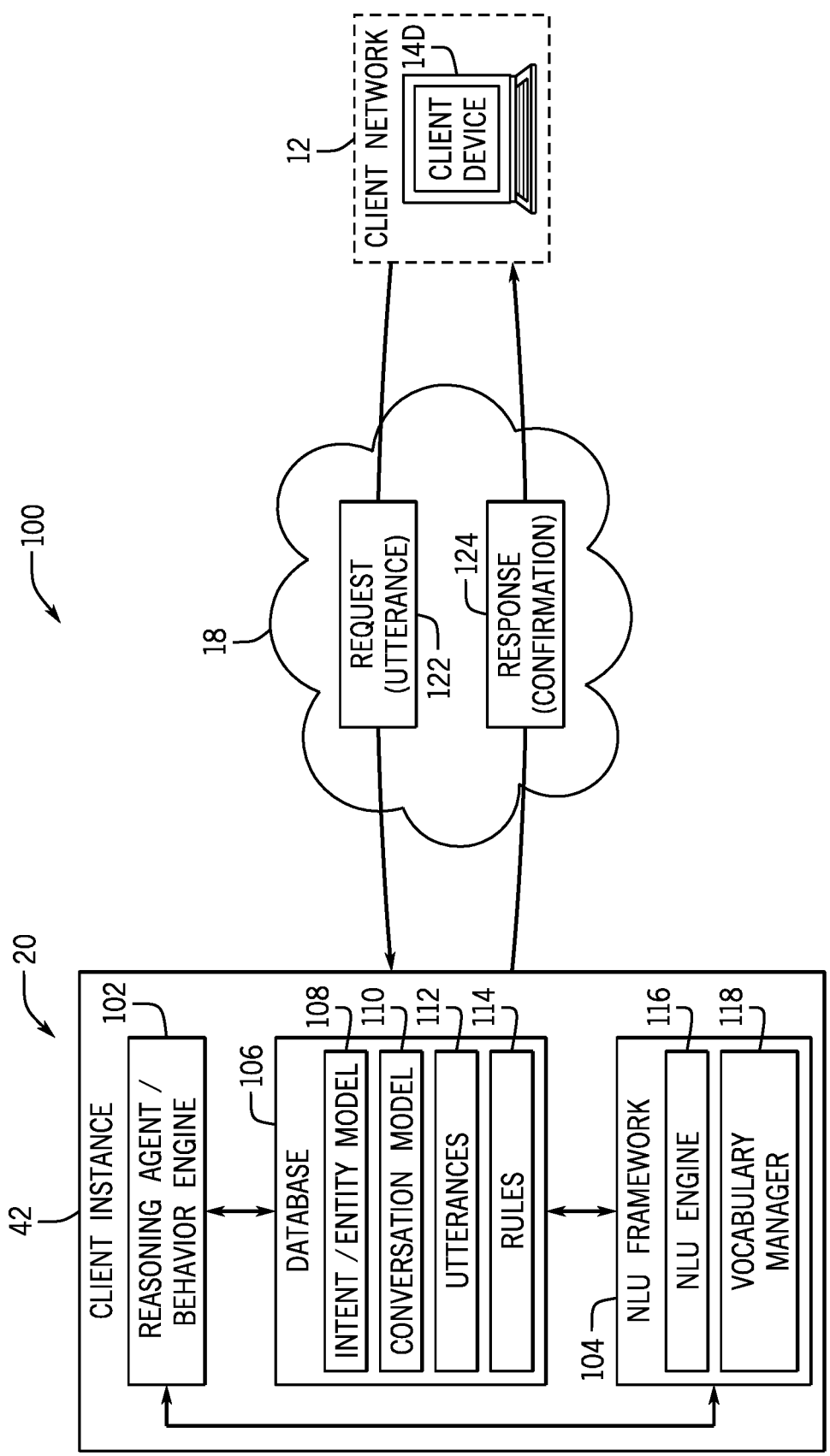
FIG. 4A is a schematic diagram illustrating an embodiment of an agent automation framework including a NLU framework that is part of a client instance hosted by the cloud computing system, in accordance with aspects of the present technique.

With the foregoing in mind, FIG. 4A illustrates an agent automation framework 100 (also referred to herein as an agent automation system 100) associated with a client instance 42, in accordance with embodiments of the present technique. More specifically, FIG. 4A illustrates an example of a portion of a service provider cloud infrastructure, including the cloud-based platform 20 discussed above. The cloud-based platform 20 is connected to a client device 14D via the network 18 to provide a user interface to network applications executing within the client instance 42 (e.g., via a web browser of the client device 14D). Client instance 42 is supported by virtual servers similar to those explained with respect to FIG. 2, and is illustrated here to show support for the disclosed functionality described herein within the client instance 42. The cloud provider infrastructure is generally configured to support a plurality of end-user devices, such as client device 14D, concurrently, wherein each end-user device is in communication with the single client instance 42. Also, the cloud provider infrastructure may be configured to support any number of client instances, such as client instance 42, concurrently, with each of the instances in communication with one or more end-user devices. As mentioned above, an end-user may also interface with client instance 42 using an application that is executed within a web browser.

The embodiment of the agent automation framework 100 illustrated in FIG. 4A includes a reasoning agent/behavior engine (RA/BE) 102, a NLU framework 104, and a database 106, which are communicatively coupled within the client instance 42. The RA/BE 102 may host or include any suitable number of virtual agents or personas that interact with the user of the client device 14D via natural language user requests 122 (also referred to herein as user utterances 122) and agent responses 124 (also referred to herein as agent utterances 124). It may be noted that, in actual implementations, the agent automation framework 100 may include a number of other suitable components, including the meaning extraction subsystem, the meaning search subsystem, and so forth, in accordance with the present disclosure.

For the embodiment illustrated in FIG. 4A, the database 106 may be a database server instance (e.g., database server instance 44A or 44B, as discussed with respect to FIG. 2), or a collection of database server instances. The illustrated database 106 stores an intent/entity model 108, a conversation model 110, a corpus of utterances 112, and a collection of rules 114 in one or more tables (e.g., relational database tables) of the database 106. The intent/entity model 108 stores associations or relationships between particular intents and particular sample utterances. In certain embodiments, the intent/entity model 108 may be authored by a designer using a suitable authoring tool. However, it should be noted that such intent/entity models typically include a limited number of sample utterances provided by the designer. Additionally, designers may have limited linguistic knowledge and, furthermore, are constrained from reasonably providing a comprehensive list of all possible ways of specifying intents in a domain. It is also presently recognized that, since the meaning associated with various intents and entities is continuously evolving within different contexts (e.g., different language evolutions per domain, per cultural setting, per client, and so forth), authored intent/entity models generally are manually updated over time. As such, it is recognized that authored intent/entity models are limited by the time and ability of the designer, and as such, these human-generated intent/entity models can be limited in both scope and functionality.

With this in mind, in certain embodiments, the intent/entity model 108 may instead be generated from the corpus of utterances 112 using techniques described in the commonly assigned, co-pending U.S. patent application Ser. No. 16/179,681, entitled, "METHOD AND SYSTEM FOR AUTOMATED INTENT MINING, CLASSIFICATION AND DISPOSITION," incorporated by reference above. More specifically, the intent/entity model 108 may be generated based on the corpus of utterances 112 and the collection of rules 114 stored in one or more tables of the database 106. It may be appreciated that the corpus of utterances 112 may include source data collected with respect to a particular context, such as chat logs between users and a help desk technician within a particular enterprise, from a particular group of users, communications collected from a particular window of time, and so forth. As such, the corpus of utterances 112 enable the agent automation framework 100 to build an understanding of intents and entities that appropriately correspond with the terminology and diction that may be particular to certain contexts and/or technical fields, as discussed in greater detail below.

For the embodiment illustrated in FIG. 4A, the conversation model 110 stores associations between intents of the intent/entity model 108 and particular responses and/or actions, which generally define the behavior of the RA/BE 102. In certain embodiments, at least a portion of the associations within the conversation model are manually created or predefined by a designer of the RA/BE 102 based on how the designer wants the RA/BE 102 to respond to particular identified intents/entities in processed utterances. It should be noted that, in different embodiments, the database 106 may include other database tables storing other information related to intent classification, such as a tables storing information regarding compilation model template data (e.g., class compatibility rules, class-level scoring coefficients, tree-model comparison algorithms, tree substructure vectorization algorithms), meaning representations, and so forth, in accordance with the present disclosure.

For the illustrated embodiment, the NLU framework 104 includes a NLU engine 116 and a vocabulary manager 118 (also referred to herein as a vocabulary subsystem). It may be appreciated that the NLU framework 104 may include any suitable number of other components. In certain embodiments, the NLU engine 116 is designed to perform a number of functions of the NLU framework 104, including generating word vectors (e.g., intent vectors, subject or entity vectors, subtree vectors) from word or phrases of utterances, as well as determining distances (e.g., Euclidean distances) between these vectors. For example, the NLU engine 116 is generally capable of producing a respective intent vector for each intent of an analyzed utterance. As such, a similarity measure or distance between two different utterances can be calculated using the respective intent vectors produced by the NLU engine 116 for the two intents, wherein the similarity measure provides an indication of similarity in meaning between the two intents.

The vocabulary manager 118, which may be part of the vocabulary subsystem discussed below, addresses out-of-vocabulary words and symbols that were not encountered by the NLU framework 104 during vocabulary training. For example, in certain embodiments, the vocabulary manager 118 can identify and replace synonyms and domain-specific meanings of words and acronyms within utterances analyzed by the agent automation framework 100 (e.g., based on the collection of rules 114), which can improve the performance of the NLU framework 104 to properly identify intents and entities within context-specific utterances. Additionally, to accommodate the tendency of natural language to adopt new usages for pre-existing words, in certain embodiments, the vocabulary manager 118 handles repurposing of words previously associated with other intents or entities based on a change in context. For example, the vocabulary manager 118 could handle a situation in which, in the context of utterances from a particular client instance and/or conversation channel, the word "bike" actually refers to a motorcycle rather than a bicycle.

Once the intent/entity model 108 and the conversation model 110 have been created, the agent automation framework 100 is designed to receive a user utterance 122 (in the form of a natural language request) and to appropriately take action to address request. For example, for the embodiment illustrated in FIG. 4A, the RA/BE 102 is a virtual agent that receives, via the network 18, the utterance 122 (e.g., a natural language request in a chat communication) submitted by the client device 14D disposed on the client network 12. The RA/BE 102 provides the utterance 122 to the NLU framework 104, and the NLU engine 116, along with the various subsystems of the NLU framework discussed below, processes the utterance 122 based on the intent/entity model 108 to derive intents/entities within the utterance. Based on the intents/entities derived by the NLU engine 116, as well as the associations within the conversation model 110, the RA/BE 102 performs one or more particular predefined actions. For the illustrated embodiment, the RA/BE 102 also provides a response 124 (e.g., a virtual agent utterance or confirmation) to the client device 14D via the network 18, for example, indicating actions performed by the RA/BE 102 in response to the received user utterance 122. Additionally, in certain embodiments, the utterance 122 may be added to the utterances 112 stored in the database 106 for continued learning within the NLU framework 104, as discussed below.

It may be appreciated that, in other embodiments, one or more components of the agent automation framework 100 and/or the NLU framework 104 may be otherwise arranged, situated, or hosted for improved performance. For example, in certain embodiments, one or more portions of the NLU framework 104 may be hosted by an instance (e.g., a shared instance, an enterprise instance) that is separate from, and communicatively coupled to, the client instance 42. It is presently recognized that such embodiments can advantageously reduce the size of the client instance 42, improving the efficiency of the cloud-based platform 20. In particular, in certain embodiments, one or more components of the semantic mining framework discussed below may be hosted by a separate instance (e.g., an enterprise instance) that is communicatively coupled to the client instance 42, as well as other client instances, to enable semantic intent mining and generation of the intent/entity model 108.

Figure 4B:
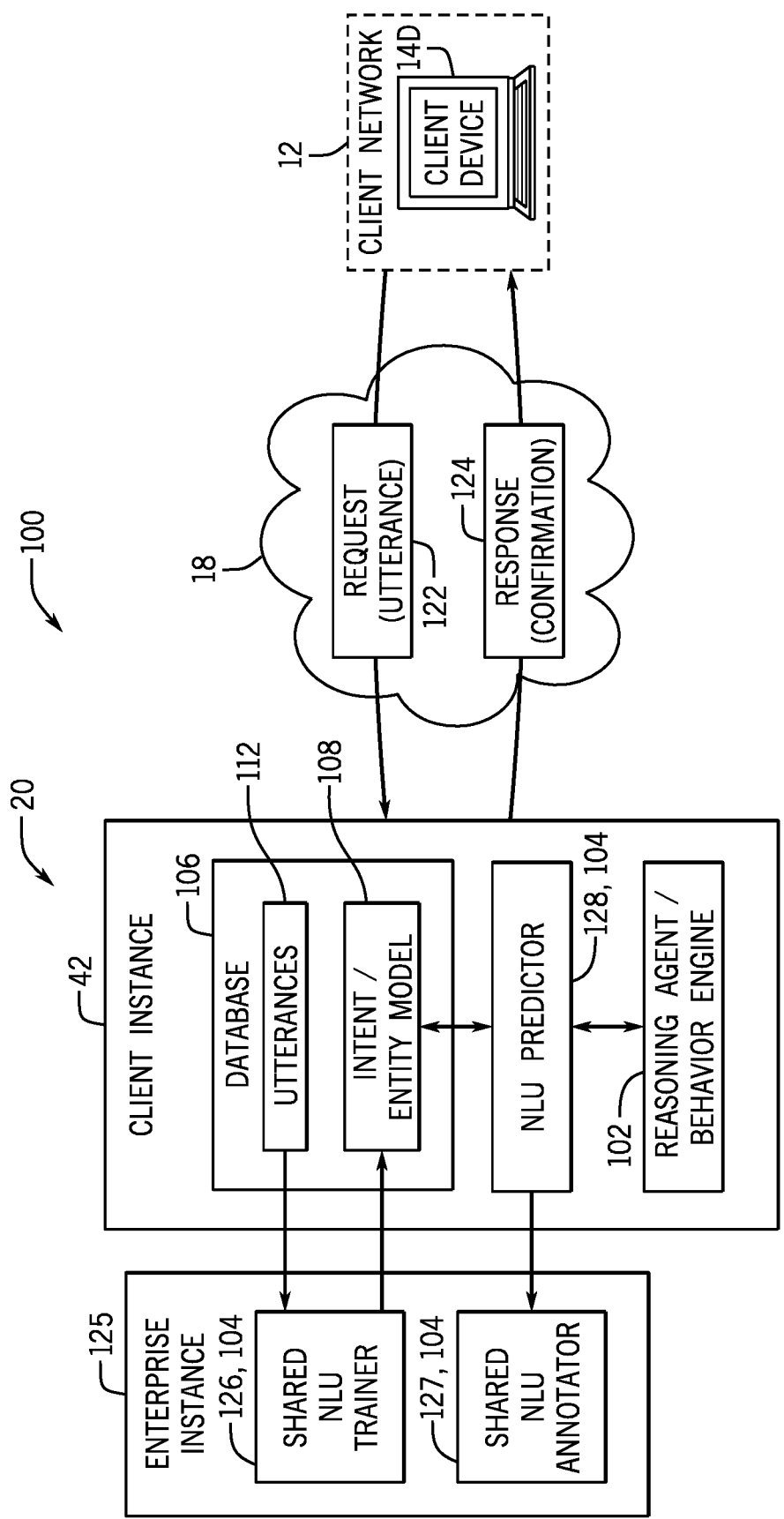
FIG. 4B is a schematic diagram illustrating an alternative embodiment of the agent automation framework in which portions of the NLU framework are part of an enterprise instance hosted by the cloud computing system, in accordance with aspects of the present technique.

With the foregoing in mind, FIG. 4B illustrates an alternative embodiment of the agent automation framework 100 in which portions of the NLU framework 104 are instead executed by a separate, shared instance (e.g., enterprise instance 125) that is hosted by the cloud computing system 20. The illustrated enterprise instance 125 is communicatively coupled to exchange data related to intent/entity mining and classification with any suitable number of client instances via a suitable protocol (e.g., via suitable Representational State Transfer (REST) requests/responses). As such, for the design illustrated in FIG. 4B, by hosting a portion of the NLU framework as a shared resource accessible to multiple client instances 42, the size of the client instance 42 can be substantially reduced (e.g., compared to the embodiment of the agent automation framework 100 illustrated in FIG. 4A) and the overall efficiency of the agent automation framework 100 can be improved.

In particular, the NLU framework 104 illustrated in FIG. 4B is divided into three distinct components that perform different aspects of semantic mining and intent classification within the NLU framework 104. These components include: a shared NLU trainer 126 hosted by the enterprise instance 125, a shared NLU annotator 127 hosted by the enterprise instance 125, and a NLU predictor 128 hosted by the client instance 42. It may be appreciated that the organizations illustrated in FIGS. 4A and 4B are merely examples, and in other embodiments, other organizations of the NLU framework 104 and/or the agent automation framework 100 may be used, in accordance with the present disclosure.

For the embodiment of the agent automation framework 100 illustrated in FIG. 4B, the shared NLU trainer 126 is designed to receive the corpus of utterances 112 from the client instance 42, and to perform semantic mining (e.g., including semantic parsing, grammar engineering, and so forth) to facilitate generation of the intent/entity model 108. Once the intent/entity model 108 has been generated, when the RA/BE 102 receives the user utterance 122 provided by the client device 14D, the NLU predictor 128 passes the utterance 122 and the intent/entity model 108 to the shared NLU annotator 127 for parsing and annotation of the utterance 122. The shared NLU annotator 127 performs semantic parsing, grammar engineering, and so forth, of the utterance 122 based on the intent/entity model 108 and returns annotated utterance trees of the utterance 122 to the NLU predictor 128 of client instance 42. The NLU predictor 128 then uses these annotated structures of the utterance 122, discussed below in greater detail, to identify matching intents from the intent/entity model 108, such that the RA/BE 102 can perform one or more actions based on the identified intents. It may be appreciated that the shared NLU annotator 127 may correspond to the meaning extraction subsystem 150, and the NLU predictor may correspond to the meaning search subsystem 152, of the NLU framework 104, as discussed below.

Figure 5:
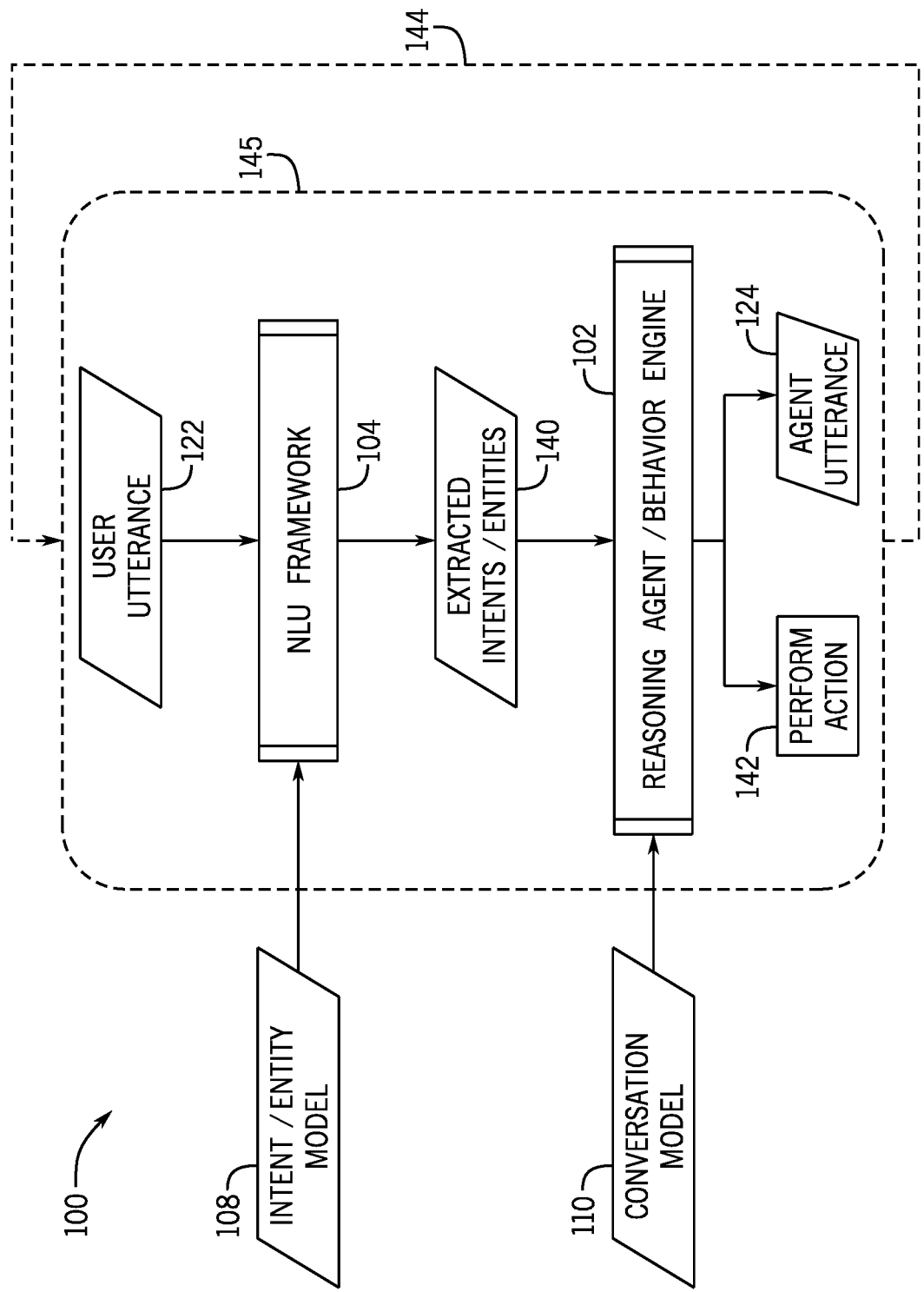
FIG. 5 is a flow diagram illustrating an embodiment of a process by which an agent automation framework, including an NLU framework and a Reasoning Agent/Behavior Engine (RA/BE) framework, extracts intent/entities from and responds to a user utterance, in accordance with aspects of the present technique.

FIG. 5 is a flow diagram depicting the roles of the reasoning agent/behavior engine (RA/BE) 102 and NLU framework 104 within an embodiment of the agent automation framework 100. For the illustrated embodiment, the NLU framework 104 processes a received user utterance 122 to extract intents/entities 140 based on the intent/entity model 108. The extracted intents/entities 140 may be implemented as a collection of symbols that represent intents and entities of the user utterance 122 in a form that is consumable by the RA/BE 102. As such, these extracted intents/entities 140 are provided to the RA/BE 102, which processes the received intents/entities 140 based on the conversation model 110 to determine suitable actions 142 (e.g., changing a password, creating a record, purchasing an item, closing an account) and/or virtual agent utterances 124 in response to the received user utterance 122. As indicated by the arrow 144, the process 145 can continuously repeat as the agent automation framework 100 receives and addresses additional user utterances 122 from the same user and/or other users in a conversational format.

As illustrated in FIG. 5, it may be appreciated that, in certain situations, no further action or communications may occur once the suitable actions 142 have been performed. Additionally, it should be noted that, while the user utterance 122 and the agent utterance 124 are discussed herein as being conveyed using a written conversational medium or channel (e.g., chat, email, ticketing system, text messages, forum posts), in other embodiments, voice-to-text and/or text-to-voice modules or plugins could be included to translate spoken user utterance 122 into text and/or translate text-based agent utterance 124 into speech to enable a voice interactive system, in accordance with the present disclosure. Furthermore, in certain embodiments, both the user utterance 122 and the virtual agent utterance 124 may be stored in the database 106 (e.g., in the corpus of utterances 112) to enable continued learning of new structure and vocabulary within the agent automation framework 100.

Figure 6:
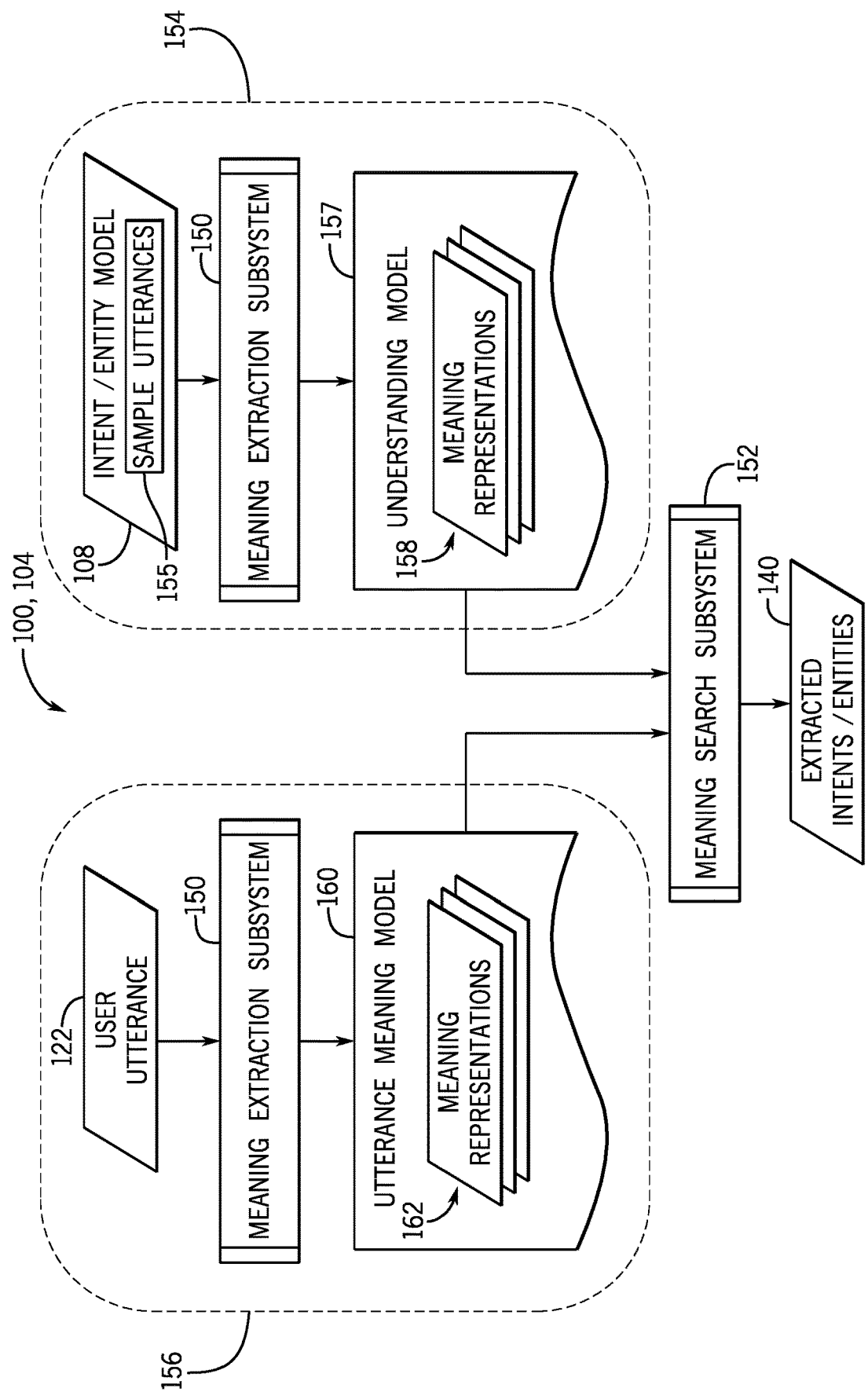
FIG. 6 is a block diagram illustrating an embodiment of the NLU framework including a meaning extraction subsystem and a meaning search subsystem, wherein the meaning extraction subsystem generates meaning representations from a received user utterance to yield an utterance meaning model and generates meaning representations from sample utterances of an intent/entity model to yield understanding model, and wherein the meaning search subsystem compares meaning representations of the utterance meaning model to meaning representations of the understanding model to extract intents and entities from the received user utterance, in accordance with aspects of the present technique.

As mentioned, the NLU framework 104 includes two primary subsystems that cooperate to convert the hard problem of NLU into a manageable search problem—namely: a meaning extraction subsystem and a meaning search subsystem. For example, FIG. 6 is a block diagram illustrating roles of the meaning extraction subsystem 150 and the meaning search subsystem 152 of the NLU framework 104 within an embodiment of the agent automation framework 100. For the illustrated embodiment, the right-hand portion 154 of FIG. 6 illustrates the meaning extraction subsystem 150 of the NLU framework 104 receiving the intent/entity model 108, which includes sample utterances 155 for each of the various intents/entities of the model. The meaning extraction subsystem 150 generates an understanding model 157 that includes meaning representations 158 of the sample utterances 155 of the intent/entity model 108. In other words, the understanding model 157 is a translated or augmented version of the intent/entity model 108 that includes meaning representations 158 to enable searching (e.g., comparison and matching) by the meaning search subsystem 152, as discussed below. As such, it may be appreciated that the right-hand portion 154 of FIG. 6 is generally performed in advance of receiving the user utterance 122, such as on a routine, scheduled basis or in response to updates to the intent/entity model 108.

For the embodiment illustrated in FIG. 6, the left-hand portion 156 illustrates the meaning extraction subsystem 150 also receiving and processing the user utterance 122 to generate an utterance meaning model 160 having at least one meaning representation 162. As discussed in greater detail below, these meaning representations 158 and 162 are data structures having a form that captures the grammatical, syntactic structure of an utterance, wherein subtrees of the data structures include subtree vectors that encode the semantic meanings of portions of the utterance. As such, for a given utterance, a corresponding meaning representation captures both syntactic and semantic meaning in a common meaning representation format that enables searching, comparison, and matching by the meaning search subsystem 152, as discussed in greater detail below. Accordingly, the meaning representations 162 of the utterance meaning model 160 can be generally thought of like a search key, while the meaning representations of the understanding model 157 define a search space in which the search key can be sought. Accordingly, the meaning search subsystem 152 searches the meaning representations 158 of the understanding model 157 to locate one or more intents/entities that match the meaning representation 162 of the utterance meaning model 160 as discussed below, thereby generating the extracted intents/entities 140.

Figure 7:
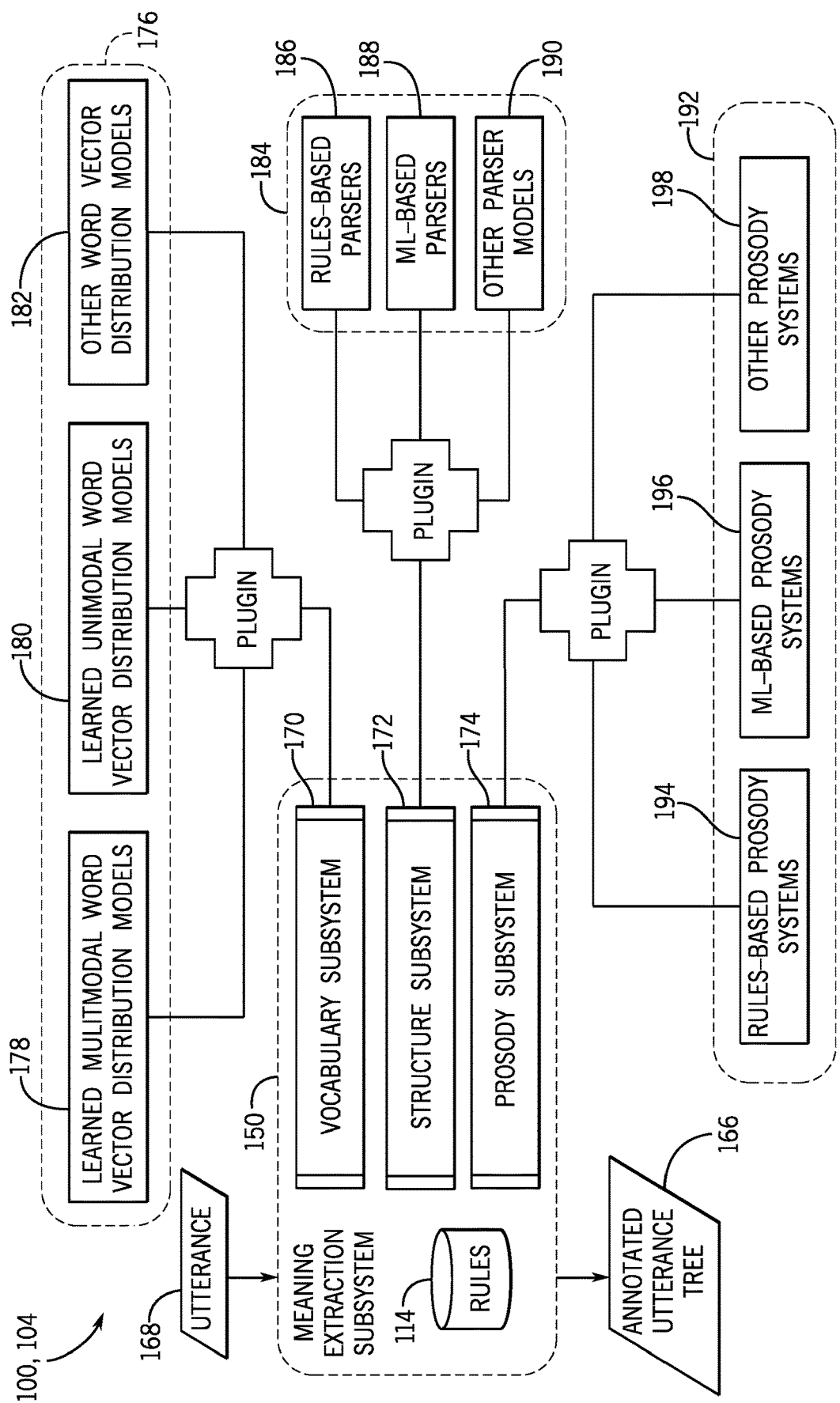
FIG. 7 is a block diagram illustrating an embodiment of the meaning extraction subsystem using a combination of rules-based methods and machine-learning (ML)-based methods within a vocabulary subsystem, a structure subsystem, and a prosody subsystem of the NLU framework, to generate an annotated utterance tree for an utterance, in accordance with aspects of the present technique.

The meaning extraction subsystem of FIG. 6 itself uses a number of subsystems of the NLU framework 104 that cooperate to generate the meaning representations 158 and 162. For example, FIG. 7 is a block diagram illustrating an embodiment of the meaning extraction subsystem 150 of the NLU framework 104 of the agent automation framework 100. The illustrated embodiment of the meaning extraction subsystem 150 uses a rules-based methods interleaved with ML-based methods to generate an annotated utterance tree 166 for an utterance 168, which may be either a user utterance 122 or one of the sample utterances 155 of the intent/entity model 108, as discussed above with respect to FIG. 6. More specifically, FIG. 7 illustrates how embodiments of the meaning extraction subsystem 150 can utilize a number of best-of-breed models, including combinations of rule-based and ML-based (e.g., statistical) models and programs, that can be plugged into the overall NLU framework 104. For example, because of the pluggable design of the illustrated meaning extraction subsystem 150, the vocabulary subsystem 170 can include any suitable word vector distribution model that defines word vectors for various words or phrases. That is, since it is recognized that different word distribution models can excel over others in a given conversational channel, language, context, and so forth, the disclosed pluggable design enables the meaning extraction subsystem 150 to be customized to particular environments and applications. For the embodiment illustrated in FIG. 7, the meaning extraction subsystem 150 uses three plugin-supported subsystems of the NLU framework 104, namely a vocabulary subsystem 170, a structure subsystem 172, and a prosody subsystem 174, and the various outputs of these subsystems are combined according to the stored rules 114 to generate the annotated utterance tree 166 from the utterance 168.

For the embodiment of the meaning extraction subsystem 150 illustrated in FIG. 7, the vocabulary subsystem 170 generally handles the vocabulary of the meaning extraction subsystem 150. As such, the illustrated meaning extraction subsystem 150 includes a number of vocabulary plug-ins 176 that enable analysis and extraction of the vocabulary of utterances. For the illustrated embodiment, the vocabulary plug-ins 176 include a learned multimodal word vector distribution model 178, a learned unimodal word vector distribution model 180, and any other suitable word vector distribution models 182. In this context, "unimodal" refers to word vector distribution models having a single respective vector for each word, while "multimodal" refers to word vector distribution models supporting multiple vectors for particular words (e.g., homonyms, polysemes) that can have different meanings in different contexts (e.g., a "bank" may refer to a place to store money, money itself, a maneuver of an aircraft, or a location near a river). The models 178, 180, and 182 provide pluggable collections of word vectors that can be selected based on suitable parameters, such as language, conversation style, conversational channel, and so forth.

For example, the learned multimodal distribution model 178 and the learned unimodal distribution model 180 can provide word distributions (e.g., defined vector spaces of word vectors) that are generated using unsupervised learning or other general clustering algorithms, as discussed below with respect to FIG. 12. That is, appreciating that words commonly used in close proximity within utterances often have related meanings, the learned multimodal distribution model 178 and learned unimodal distribution model 180 can be generated by performing statistical analysis of utterances (e.g., from the corpus of utterances 112), and then defining vectors for words based on how the word is commonly used with respect to other words within these utterances. As such, these vocabulary plugins 176 enable the vocabulary subsystem 170 to recognize and address synonyms, misspelled words, encoded symbols (e.g., web addresses, network paths, emoticons, and emojis), out-of-vocabulary terms, and so forth, when processing the user utterance 122 and sample utterances 155. In certain embodiments, the vocabulary subsystem 170 can combine or select from word vectors output by the various vocabulary plug-ins 176 based on the stored rules 114 to generate word vectors for nodes of the annotated utterance tree 166, as discussed below. Moreover, the word vector distribution models 178, 180, and/or 182 can be continually updated based on unsupervised learning performed on received user utterances 122, as discussed below with respect to FIG. 12.

For the embodiment illustrated in FIG. 7, the structure subsystem 172 of the meaning extraction subsystem 150 analyzes a linguistic shape of the utterance 168 using a combination of rule-based and ML-based structure parsing plugins 184. In other words, the illustrated structure plug-ins 184 enable analysis and extraction of the syntactic and grammatical structure of the utterances 122 and 155. For the illustrated embodiment, the structure plug-ins 184 include rule-based parsers 186, ML-based parsers 188 (e.g., DNN-based parsers, RNN-based parsers, and so forth), and other suitable parser models 190. For example, one or more of these structure plug-ins 184 enables class annotations or tagging (e.g., as a verb, a subject or entity, a direct object, a modifier, and so forth) for each word or phrase of the utterance. In certain embodiments, the structure subsystem 172 can combine or select from parse structures output by the various structure plug-ins 184 based on one or more rules 114 stored in the database 106, which are used to define the structure or shape of the annotated utterance trees 166, as discussed below.

For the embodiment illustrated in FIG. 7, the prosody subsystem 174 of the meaning extraction subsystem 150 analyzes the prosody of the utterance 168 using a combination of rule-based and ML-based prosody plugins 196. The illustrated prosody plug-ins 192 include rule-based prosody systems 194, ML-based prosody systems 196, and other suitable prosody systems 198. Using these plugins, the prosody subsystem 174 analyzes the utterance 168 for prosodic cues, including written prosodic cues such as rhythm (e.g., chat rhythm, such as utterance bursts, segmentations indicated by punctuation or pauses), emphasis (e.g., capitalization, bolding, underlining, asterisks), focus or attention (e.g., repetition of particular terms or styles), and so forth, which can be used to determine, for example, boundaries between intents, degrees of urgency or relative importance with respect to different intents, and so forth. As such, in certain embodiments, the prosody subsystem 174 can combine or select from prosody parsed structures output by the various prosody plug-ins 192 based on the rules 114 stored in the database 106 to generate the annotated utterance tree 166, as discussed below.

As such, for the embodiment of the meaning extraction subsystem 150 illustrated in FIG. 7, the vocabulary subsystem 170, the structure subsystem 172, and the prosody subsystem 174 of the NLU framework 104 cooperate to generate the annotated utterance tree 166 from the utterance 168 based on one or more rules 114. It may be appreciated that, in certain embodiments, a portion of the output of one subsystem (e.g., the prosody subsystem 174) may be provided as input to another subsystem (e.g., the structure subsystem 172) when generating the annotated utterance tree 166 from the utterance 168. The resulting annotated utterance tree 166 data structure generated by the meaning extraction subsystem 150 includes a number of nodes, each associated with a respective word vector provided by the vocabulary subsystem 170. Furthermore, these nodes are arranged and coupled together to form a tree structure based on the output of the structure subsystem 172 and the prosody subsystem 174, according to the stored rules 114.

Figure 8:
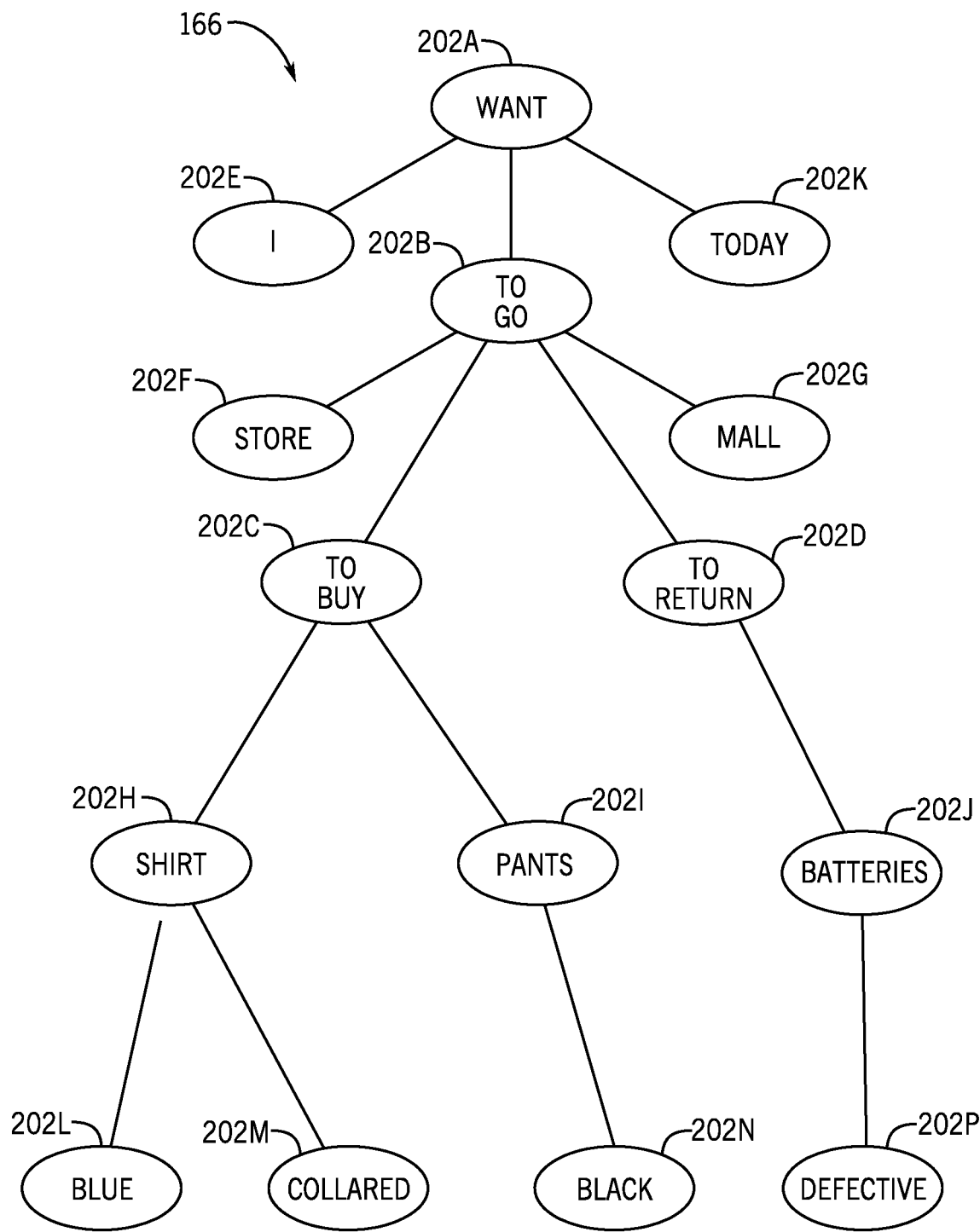
FIG. 8 is a diagram illustrating an example of an annotated utterance tree generated for an utterance, in accordance with an embodiment of the present approach.

For example, FIG. 8 is a diagram illustrating an example of an annotated utterance tree 166 generated for an utterance 168, in accordance with an embodiment of the present approach. As mentioned, the annotated utterance tree 166 is a data structure that is generated by the meaning extraction subsystem 150 based on the utterance 168. For the example illustrated in FIG. 8, the annotated utterance tree 166 is based on an example utterance, "I want to go to the store by the mall today to buy a blue, collared shirt and black pants and also to return some defective batteries." The illustrated annotated utterance tree 166 includes a set of nodes 202 (e.g., nodes 202A, 202B, 202C, 202D, 202E, 202F, 202G, 202H, 202I, 202J, 202K, 202L, 202M, 202N, and 202P) arranged in a tree structure, each node representing a particular word or phrase of the utterance 168. It may be noted that each of the nodes 202 may also be described as representing a particular subtree of the annotated utterance tree 166, wherein a subtree can include one or more nodes 202.

As mentioned, the form or shape of the annotated utterance tree 166 illustrated in FIG. 8 is determined by the prosody subsystem 174 and the structure subsystem 172 and represents the syntactic, grammatical meaning of the example utterance. More specifically, the prosody subsystem 174 breaks the utterance into intent segments, while the structure subsystem 172 constructs the annotated utterance tree 166 from these intent segments. Each of the nodes 202 store or reference a respective word vector that is determined by the vocabulary subsystem 170 to indicate the semantic meaning of the particular word or phase of the utterance. As mentioned, each word vector is an ordered n-dimensional list (e.g., a 300 dimensional list) of floating point values (e.g., a 1×N or an N×1 matrix) that provides a mathematical representation of the semantic meaning of a portion of an utterance.

Moreover, each of the nodes 202 is annotated by the structure subsystem 172 with additional information about the word or phrase represented by the node. For example, in FIG. 8, each of the nodes 202 has a respective shading or cross-hatching that is indicative of the class annotation of the node. In particular, for the example annotated utterance tree illustrated in FIG. 8, certain subtrees or nodes (e.g., nodes 202A, 202B, 202C, and 202D) are annotated to be verb nodes, and certain subtrees or nodes (e.g., nodes 202E, 202F, 202G, 202H, 202I, and 202J) are annotated to be subject or object nodes, and certain subtrees or nodes (e.g., nodes 202K, 202L, 202M, 202N, and 202P) are annotated to be modifier nodes (e.g., subject modifier nodes, object modifier nodes, verb modifier nodes) by the structure subsystem 172. These class annotations are used by the meaning search subsystem 152 when comparing meaning representations that are generated from annotated utterance trees, like the example annotated utterance tree 166 illustrated in FIG. 8. As such, it may be appreciated that the annotated utterance tree 166, from which the meaning representations are generated, serves as a basis (e.g., an initial basis) for intent/entity extraction.

Figure 9:
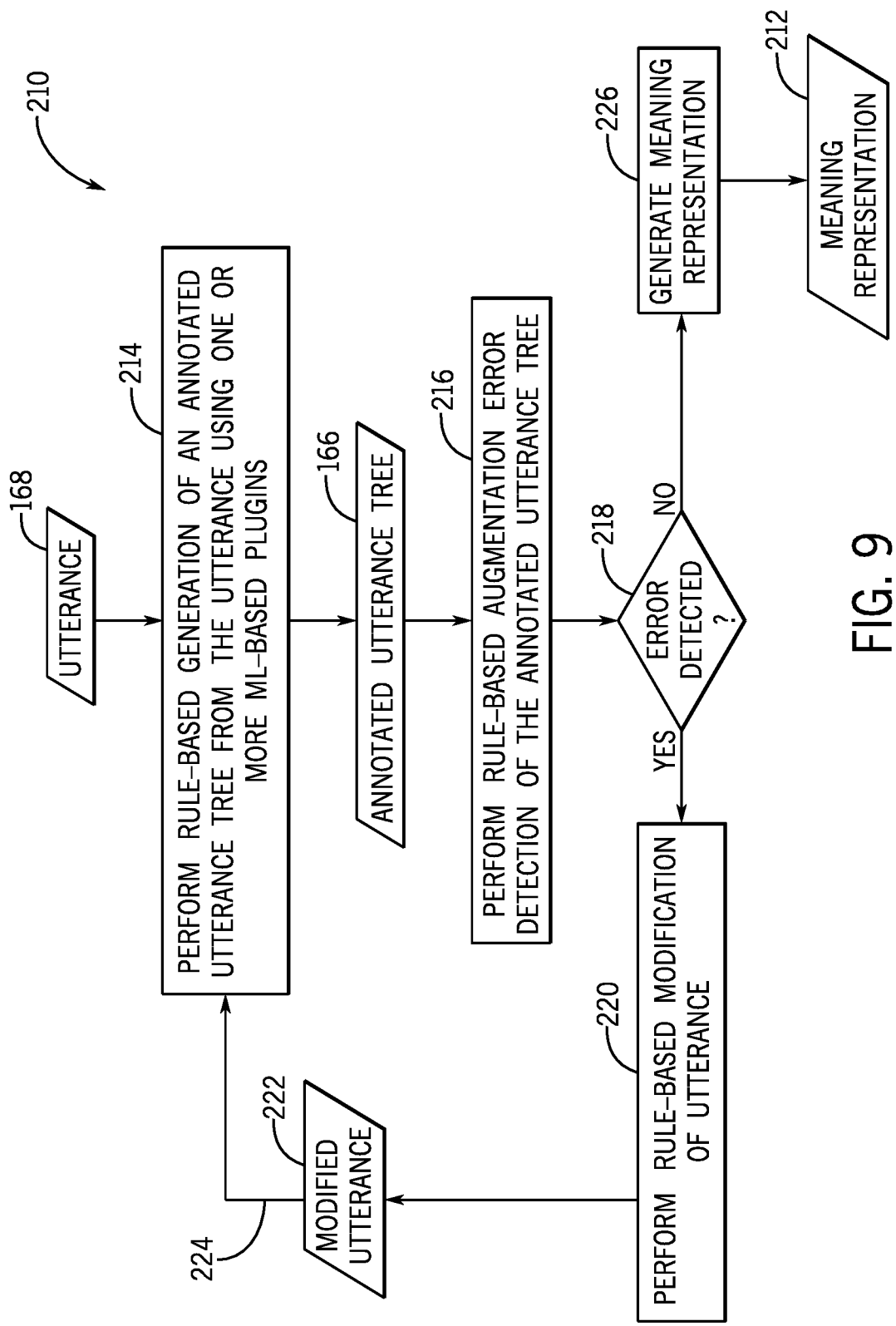
FIG. 9 is a flow diagram illustrating an example process by which the meaning extraction subsystem performs error correction of an annotated utterance tree of an utterance before generating the corresponding meaning representation of the utterance, in accordance with aspects of the present technique.

It may also be noted that, in certain embodiments, the meaning extraction subsystem 150 includes rule-based error detection and correction mechanisms for improved domain specificity. For example, FIG. 9 is a flow diagram illustrating an embodiment of a process 210 whereby the meaning extraction subsystem 150 can iteratively generate and then analyze the annotated utterance tree 166 for errors before a corresponding meaning representation 212 is generated for searching. In other words, to accommodate inaccuracies and unexpected output from ML-based models of the vocabulary subsystem 170, the structure subsystem 172, and/or the prosody subsystem 174, the meaning extraction subsystem 150 is capable of performing a rule-based automated error detection process before the corresponding meaning representation 212 is generated. It may be appreciated that, when the utterance 168 is a user utterance 122, the corresponding meaning representation 212 becomes part of the meaning representations 162 of the utterance meaning model 160, and when the utterance is one of the sample utterance 155 of the intent/entity model 108, the corresponding meaning representation 212 becomes part of the meaning representations 158 of the understanding model 157, as discussed above with respect to FIG. 6.

For the embodiment illustrated in FIG. 9, the process 210 begins with the meaning extraction subsystem 150 of the NLU framework 104 generating (block 214) the annotated utterance tree 166 from the utterance 168 using one or more ML-based plugins (e.g., ML-based parsers 188 or ML-based prosody systems 196), as discussed above. In certain embodiments, this step may include a preliminary cleansing and augmentation step performed before the annotated utterance tree 166 is generated. For example, in certain embodiments, this preliminary cleansing and augmentation step may involve the vocabulary subsystem 170, the structure subsystem 172, and/or the prosody subsystem 174 modifying the utterance 168 based on the stored rules 114. By way of specific example, during this step, the utterance 168 may be processed by the vocabulary subsystem 170 to modify words of the utterance (e.g., substitute synonyms, correct misspellings, remove punctuation, address domain-specific syntax and terminology, combine words, separate compounds words and contractions) based on the rules 114.

Then, the vocabulary subsystem 170, the structure subsystem 172, and the prosody subsystem 174 of the meaning extraction subsystem 150 can cooperate to generate the annotated utterance tree 166 from the utterance 168 based on the stored rules 114.

Additionally, for the embodiment illustrated in FIG. 9, the process 210 includes a rule-based augmentation error and detection step (block 216) in which the generated annotated utterance tree 166 is analyzed for errors based on the stored rules 114. These errors may include, for example, misclassification, misparses, and so forth, by one or more ML-based plugins of the meaning extraction subsystem 150. When, during the rule-based augmentation error and detection step of block 216, the meaning extraction subsystem 150 detects an error (decision block 218), then the meaning extraction subsystem 150 performs a rule-based correction (block 220) to generate a modified utterance 222 from the original or previous utterance 168 based on the stored rules 114.

In situations in which errors are detected in block 218, once the correction has been applied in block 220, the annotated utterance tree 166 is regenerated in block 214 from the modified utterance 222 based on the rules 114, as indicated by the arrow 224. In certain embodiments, this cycle may repeat any suitable number of times, until errors are no longer detected at decision block 218. At that point, the meaning extraction subsystem 150 generates (block 226) the corresponding meaning representation 212 to be processed by the meaning search subsystem 152, as discussed below. In certain embodiments, information regarding the corrections performed in block 220 and the resulting annotated utterance tree 166 that is converted to the meaning representation 212 may be provided as input to train one or more ML-based plugins of the meaning extraction subsystem 150 e.g., ML-based parsers 188 or ML-based prosody systems 196), such that the erroneous annotated utterance trees can be avoided when processing future utterances. In certain embodiments, generating the corresponding meaning representation 212 for the annotated utterance tree 166 (block 226) may include determining compilation unit information (e.g., root nodes, parent root nodes, and subtree vectors) and optimizing the meaning representations for search.

As mentioned above, the prosody subsystem 174 is capable of applying rules-based and ML-based techniques to analyze prosodic cues to determine natural breaks and emphases in written language. For example, in certain embodiments, the prosodic cues may include written-modality prosodic cues, such as punctuation, emojis, emphases (e.g., bold, italic, all-caps, etc.), linguistic structure, and so forth. The prosodic cues may also include temporal cues, such as a time that the message was sent, a delay between messages, a number of messages sent within a limited time window, and so forth. In addition to temporal prosodic cues, the prosodic cues may also include other conversation metadata cues, such as the user that generated each message, the conversation channel of the message, and so forth.

As such, embodiments of the prosody subsystem 174 may be configured to apply a set of rules 114 stored in the database 106 to detect various features within written natural language and/or corresponding metadata. For example, the prosody subsystem 174 may apply one or more of the rules 114 to detect natural breaks in written language at differing levels, to detect emphases on particular portions of the data, to detect interrupts and/or topic changes, and/or to detect cadence-related characteristics. In certain embodiments, at least a portion of the rules 114 based on annotations or metadata pertaining to the communications (e.g., a time/date stamp data, message grouping data, author/source data, etc.). In certain embodiments, a portion of the rules 114 may be based on the structure (e.g., linguistic structure, utterance groupings, etc.) of the communications themselves. In certain embodiments, the prosody subsystem 174 may include rules 114 that are determined or learned by a ML-based prosody component or a statistical model. For example, in certain embodiments, a ML-based prosody system 196 may generate rules 114 based on a determined the cadence of written conversation, which will differ based on the conversation medium or channel (e.g., a forum may demonstrate a different conversational cadence that a chat room or an email exchange), based on context (e.g., a written exchange regarding IT support will have a different conversation cadence than a social conversation), and based on other attributes of the written media (e.g., learned cue words surrounding breakpoint contexts, token collection dissimilarity across breakpoint contexts, etc.).

Figure 10:
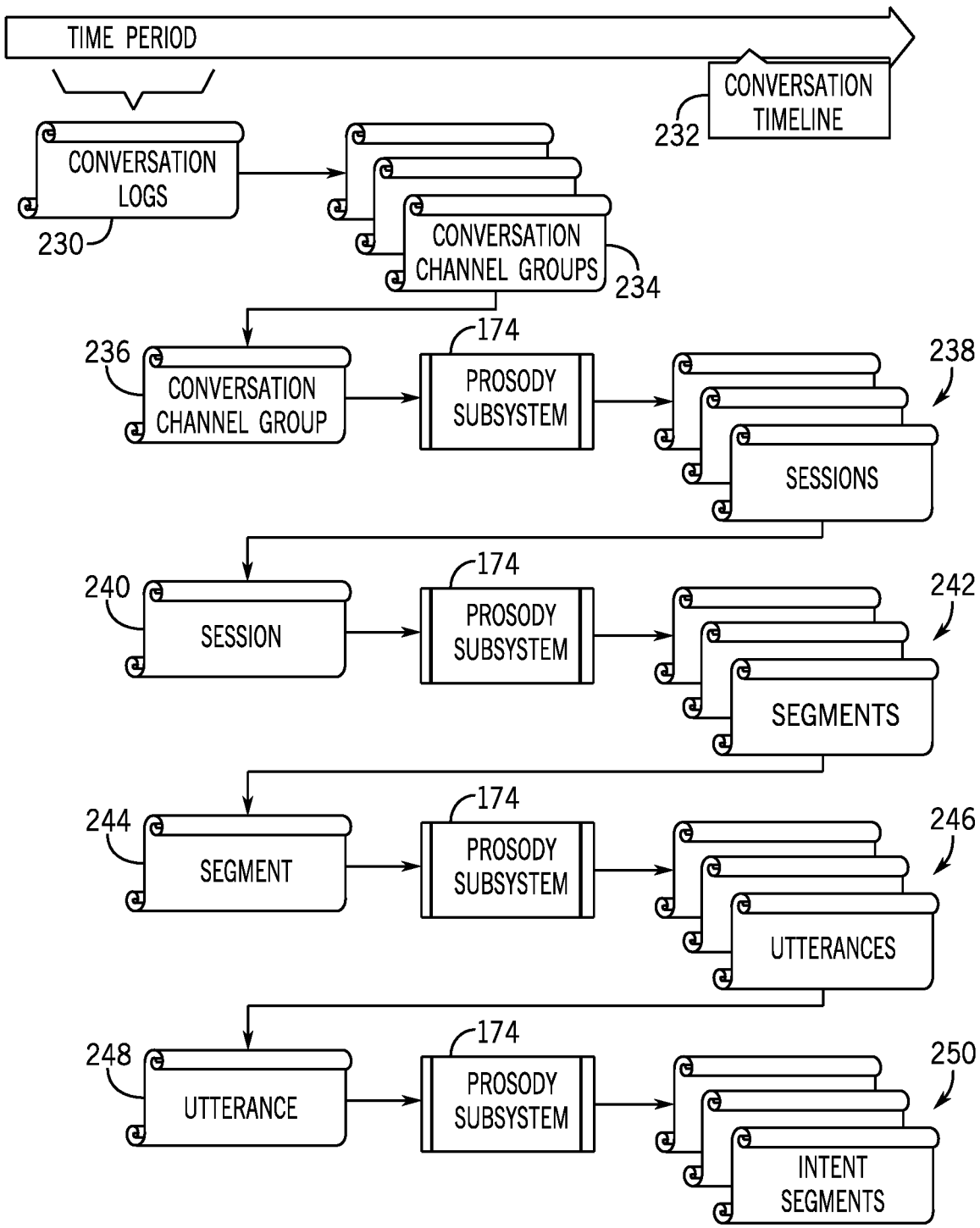
FIG. 10 is a flow diagram illustrating an embodiment of the prosody subsystem digesting conversation logs into a number of different outputs for consumption by various components of the NLU framework, in accordance with aspects of the present technique.

With the foregoing in mind, FIG. 10 is a diagram illustrating an embodiment of the prosody subsystem 174 digesting conversation logs 230 (e.g., chat logs, email logs, forum logs, or a combination thereof) into a number of different outputs for consumption by various components of the NLU framework 104, in accordance with aspects of the present technique. In certain embodiments, the conversation logs 230 may be stored in the database 106 as part of the corpus of utterances 112, as illustrated in FIG. 4A. The diagram of FIG. 10 includes a conversation timeline 232, which represents a collection of written messages of the conversation logs 230 over time. As such, it may be appreciated that the conversation logs 230 may include any number of communications between any number of users or agents that take place over any number of written conversation channels, such as email, chat, forums, and so forth. As mentioned, in addition to the messages themselves, the conversation logs 230 include metadata and/or annotations for each message that capture additional conversation information, such as a time that each message was sent and/or received, a size of each message, a source and recipient of each message, a conversational channel of each message, and so forth.

As illustrated in FIG. 10, particular conversation logs 230 may be selected from a particular time period in the conversation timeline 232. For example, in certain embodiments, the prosody subsystem 174 may select all conversations across all conversational channels that involve a particular user and that occur within a particular time period. Once the conversation logs 230 have been selected, the prosody subsystem 174 may first divide the conversation logs 230 into different conversation channel groups 234 based on the conversation channel associated with each message in the conversation logs 230. For example, the prosody subsystem 174 may split the selected conversation logs 230 into a first conversational channel group that includes conversations that occur via an email conversation channel, a second conversational channel group that includes conversations that occur via chat, and a third conversational channel group that includes conversations that occur via forum posts, based on the metadata prosodic cues associated with each message in the conversation logs 230.

For the embodiment illustrated in FIG. 10, each conversational channel group 236 of the conversation channel groups 234 can be subsequently processed again by the prosody subsystem 174 to divide each conversational channel group 236 into a number of different sessions 238 (e.g., chat sessions, email sessions, forum sessions). For example, in certain embodiments, the prosody subsystem 174 may analyze the metadata associated with messages in the conversation channel group 236 and identify time gaps between each of the messages based on temporal prosodic cues. The prosody subsystem 174 may then determine that, when a time difference between two messages of the conversation channel group 236 is greater than a predefined threshold value (e.g., 5 hours), then this time gap signifies the end of one of the sessions 238 and a beginning of another one of the sessions 238. Accordingly, for the illustrated embodiment, the prosody subsystem 174 splits the messages of the conversation channel group 236 into a suitable number of sessions 238 based on the metadata or temporal prosody cue associated with each message. As discussed below, the sessions 238 generated by the prosody subsystem 174 can be consumed by the RA/BE 102 to enable episodic context management within the agent automation framework 100.

For the embodiment illustrated in FIG. 10, each of the sessions 238 can be subsequently processed again by the prosody subsystem 174 to divide each session 240 into a number of different segments 242 (e.g., chat segments). For clarity, segments 242 may also be referred to herein as "conversation segment" to differentiate from "intent segments" discussed below. For example, in certain embodiments, the prosody subsystem 174 may analyze the contents of each message in the session 240 for written prosodic cues to identify topic changes. By way of particular example, the prosody subsystem 174 may cooperate with the structure subsystem 172 to identify all nouns/subjects within each intent segment of the message, and identify a change in the nouns/subjects as an indication of topic change. In certain embodiments, the prosody subsystem 174 may additionally or alternatively include a collection of transition words and phrases or interrupts (e.g., "anyway", "moving on", "by the way", "next", etc.) that are indicative of a shift in the topic within the session 240. The prosody subsystem 174 may then determine that, when a topic change is identified based on written prosodic cues, this signifies the end of one of the segments 242 and a beginning of another of the segments 242. Accordingly, for the illustrated embodiment, the prosody subsystem 174 splits the messages of the session 240 into a suitable number of segments 242 based on topic changes.

For the embodiment illustrated in FIG. 10, each of the segments 242 can be subsequently processed again by the prosody subsystem 174 to divide each segment 244 into a number of utterances 246. For example, in certain cases, the prosody subsystem 174 may first divide the segment 244 into individual messages, wherein each message represents a distinct utterances 246. However, in certain embodiments, the prosody subsystem 174 may further analyze the contents and/or the metadata associated with each message of the segment 244, and combine multiple messages that are determined to be part of a single utterance based on temporal and/or written prosodic cues. For example, the prosody subsystem 174 may determine that, when a user sends multiple messages before the other party to the conversation responds (e.g., a message burst group) and/or when the user sends multiple messages within a predefined time window (e.g., within 1 minute), then these multiple messages actually represent a single utterance. Accordingly, for the illustrated embodiment, the prosody subsystem 174 splits the messages of the segment 244 into a suitable number of utterances 246.

For the embodiment illustrated in FIG. 10, each of the utterances 246 can subsequently processed again by the prosody subsystem 174 to divide each utterance 248 into a number of different intent segments 250. For example, in certain embodiments, the prosody subsystem 174 may analyze the punctuation of the utterance as a written prosody cue to identify intent segments 250 for the utterance 248. By way of particular example, the prosody subsystem 174 may identify two sentences within the utterance 248 that are separated by a period and/or two phrases or sentence fragments separated by a comma or semicolon, as two separate intent segments 250 of the utterance 248.

However, in certain embodiments, differentiation between intent segments 250 within each utterance 248 may be achieved using cognitive construction grammar (CCG) forms. In other words, specific CCG forms can be used as formulations for specific, and potentially nested, intents. For such embodiments, the prosody subsystem 174 may provide the utterance 248 to the structure subsystem 172, and the structure subsystem 172 may parse the utterance 248 into an utterance tree. The CCG forms are then detected by traversing these utterance trees and matching predetermined CCG form tree patterns with the patterns found in the utterance trees. In certain embodiments, the predetermined CCG forms are utterance trees stored in a discourse-specific CCG forms database, which may be part of the database 106 of the client instance 42. The CCG forms themselves can be derived or predetermined in a number of ways, such as via linguistic formulation, via general forms databases available for specific languages, via discovered through unsupervised learning, or combinations thereof. For example, the predetermined CCG forms may include forms of phrases that people typically use to, for instance, change a topic (e.g., "Now, with regards to . . . ", "Speaking of which . . . ", "Going back to . . . ", and so forth). As such, by matching the predetermined CCG form tree patterns to portions of the utterance 248, the prosody subsystem 174 can detect topic context changes within a portion of a written conversation. As noted, for the NLU framework 104 to be trained and operate in a precise and domain specific manner, it is important that the prosody subsystem 174 generates the various digested outputs (e.g., utterances 246 and intent segments 250) in proper context.

Accordingly, for the illustrated embodiment, the prosody subsystem 174 splits the utterance 248 into a suitable number of intent segments 250. As discussed below, the intent segments 250 generated by the prosody subsystem 174 can be further processed and consumed to train one or more of the ML-based parsers 188 of the structure subsystem 172 of the agent automation framework 100. It may further be appreciated that, after completely processing the conversation logs 230, each of the intent segments 250 may be associated with a particular utterance 248, a particular segment 244, a particular session 240, and a particular conversation channel group 236.

Additionally, it may be appreciated that present embodiments enable entrenchment, which is a process whereby the agent automation system 100 can generally continue to learn or infer meaning of new syntactic structures in new natural language utterances based on previous examples of similar syntactic structures to improve the domain specificity of the NLU framework 104 and the agent automation system 100. For example, in an embodiment, certain models (e.g., NN structure or prosody models, word vector distribution models) are initially trained or generated using generic domain data (e.g., such as a journal, news, or encyclopedic data source). Since this generic domain data may not be representative of actual conversations (e.g., actual grammatical structure, prosody, and vocabulary) of a particular domain or conversational channel, the disclosed NLU framework 104 is capable of analyzing conversations within a given domain and/or conversational channel, such that these models can be conditioned be more accurate or appropriate for the given domain. With this in mind, it is presently recognized it is advantageous for the agent automation system 100 to have a continuously learning grammar structure model capable of accommodating changes in syntactic structure, such as new grammatical structures and changes in the use of existing grammatical structures. Additionally, as noted above, the prosody subsystem 174 can be used to generate training data (e.g., intent segments 250) that can be used to train a ML-based component of the structure subsystem 172.

Figure 11:
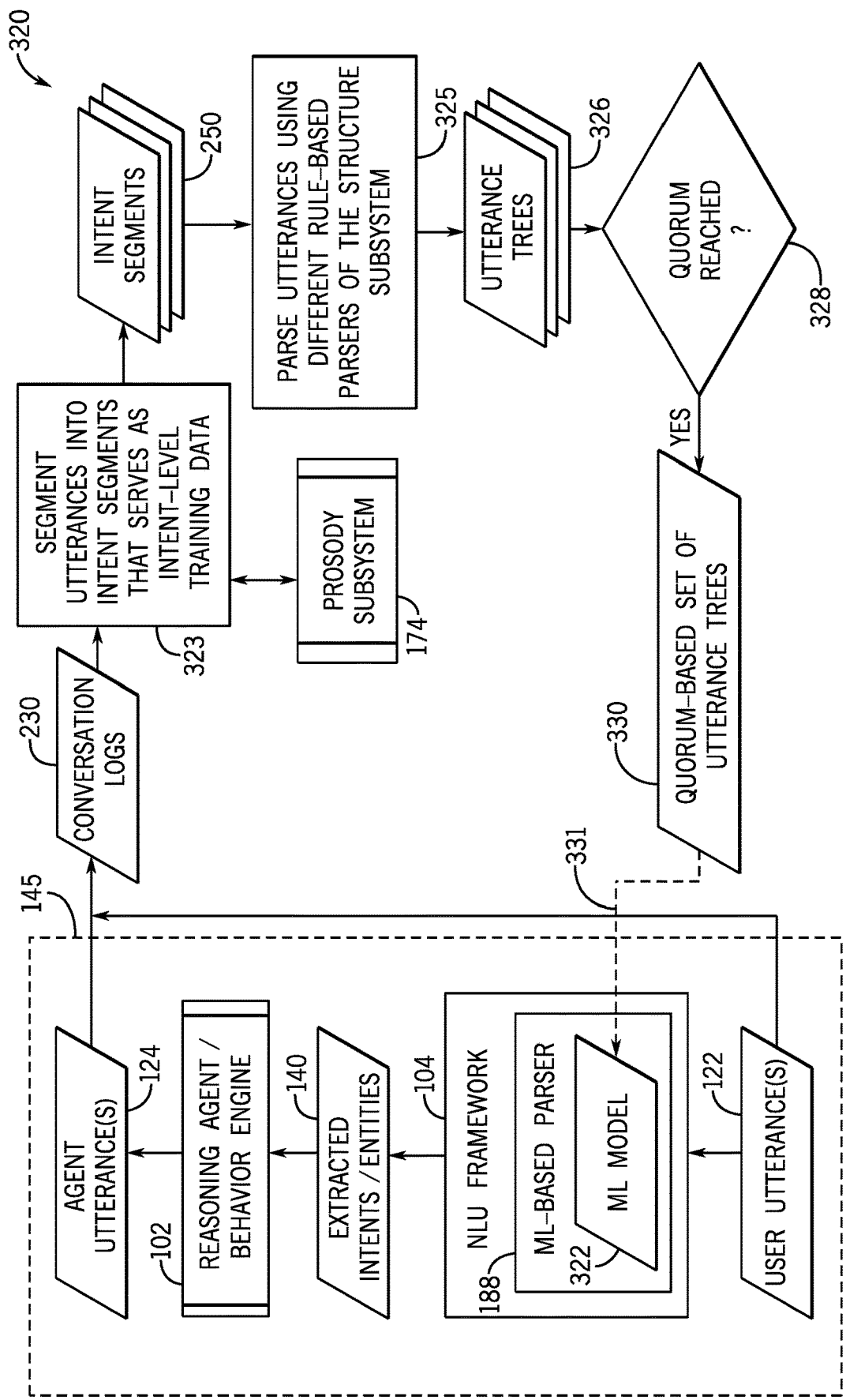
FIG. 11 is a block diagram illustrating an embodiment of a process by which the agent automation system continuously improves a structure learning model, such as a recurrent neural network associated with a ML-based parser of the NLU framework, for improved domain specificity, based on intent segments identified by the prosody subsystem, in accordance with aspects of the present technique.

With the foregoing in mind, FIG. 11 is a flow diagram illustrating an embodiment of a process 320 whereby the agent automation system 100 continuously improves a ML-based parser 188, which may be plugged into the structure subsystem 172 of the NLU framework 104, as discussed with respect to FIG. 7. For the example illustrated in FIG. 11, the ML-based parser 188 is specifically a recurrent neural network (RNN)-based parser that operates based on a RNN model 322. As such, it is appreciated that, by adjusting signal weighting within the RNN model 322, the ML-based parser 188 can continue to be trained throughout operation of the agent automation system 100 using training data generated by the prosody subsystem 174 from the conversation logs 230. For the example illustrated in FIG. 11, the conversation logs 230 include a continually growing collection of stored user utterances 122 and agent utterances 124, such as a chat log. As set forth above, the conversation logs 230 include metadata associated with each message that is exchanged between the agent and the user.

For the embodiment illustrated in FIG. 11, prior to operation of the agent automation system 100, the RNN-based model 322 may initially have a set of weights (e.g., a matrix of values) that are set by an initial training. For this example, the ML-based parser 188 may be initially trained using a first corpus of utterances having a particular grammatical style, such as a set of books, newspapers, periodicals, and so forth, having a formal or proper grammatical structure. However, it is appreciated that many utterances exchanges in different conversational channels (e.g., chat rooms, forums, and emails) may demonstrate different grammatical structures, such as less formal or more relaxed grammatical structures. With this in mind, the continual learning loop illustrated in FIG. 11 enables the RNN-model 322 associated with the ML-based parser 188 to be continually updated and adjusted, such that the ML-based parser 188 can become more adept at parsing different (e.g., less-formal or less-proper) grammatical structures in newly received user utterances 122.

The continual leaning process 320 illustrated in FIG. 11 includes receiving and responding to the user utterance 122, as discussed above with respect to the process 145 of FIG. 5. As mentioned, in certain embodiments, the user utterances 122 and the agent utterances 124, along with corresponding metadata, are collected as part of the conversation logs 230. As some point, such as during regularly scheduled maintenance, the prosody subsystem 174 of the NLU framework 104 repeatedly segments (block 323) the conversation logs 230 into intent segments 250, as discussed with respect to FIG. 10. Then, different rule-based parsers 186 and/or ML-based parsers 188 of the structure subsystem 172 of the NLU framework 104 parse (block 325) each of the intent segments 250 to generate a multiple annotated utterance tree structures 326 for each of the intent segments 250. The meaning extraction subsystem 150 then determines (in decision block 328) whether a quorum (e.g., a simple majority consensus) has been reached by the different parsers.

For the example illustrated in FIG. 11, when the NLU framework 104 determines in block 328 that a sufficient number (e.g., a majority, greater than a predetermined threshold value) of annotated utterance trees 326 for a particular intent segment are substantially the same for a quorum to be reached, then the meaning extraction subsystem 150 may use the quorum-based set of annotated utterance trees 330 to train and improve a ML-model 322 associated with the ML-based parser 188, as indicated by the arrow 331. For example, the weights within the ML-model 322 may be repeatedly adjusted until the ML-based parser 188 generates the appropriate structure from the quorum-based set of annotated utterance trees 330 for each of the intent segments 250. After this training, upon receiving a new user utterance 122 having a grammatical structure similar to a structure from the quorum-based set of annotated utterance trees 330, the operation of the ML-based parser 188, the NLU framework 104, and the agent automation system 100 is improved to parse the grammatical structure of the user utterance 122 and extract the intents/entities 140 therefrom with enhanced domain specificity.

Additionally, in certain embodiments, the agent automation system 100 can continue to learn or infer meaning of new words and phrases. It is presently recognized that this can enable the agent automation system 100 to have a continuously expanding/adapting vocabulary capable of accommodating the use of unfamiliar words, as well as changes to the meaning of familiar words. For example, FIG. 12 is a flow diagram illustrating an embodiment of a process 340 whereby the agent automation system 100 continuously improves a word vector distribution model 342, which may be plugged into the structure subsystem 172 of the NLU framework 104, such as the learned multimodal word vector distribution model 178 or the learned unimodal word vector distribution model 180 discussed above with respect to FIG. 7. As such, it is appreciated that, by expanding or modifying the word vector distribution model 342, operation of the vocabulary subsystem 170, the NLU framework 104, and the agent automation system 100 can be improved to handle words with new or changing meanings using only training data that can be generated from a continually growing conversation logs 230. For the example illustrated in FIG. 12, the corpus of utterances 112 may be, for example, a collection of chat logs storing utterances user utterances 122 and agent utterances 124 from various chat room exchanges, or other suitable source data.

Figure 12:
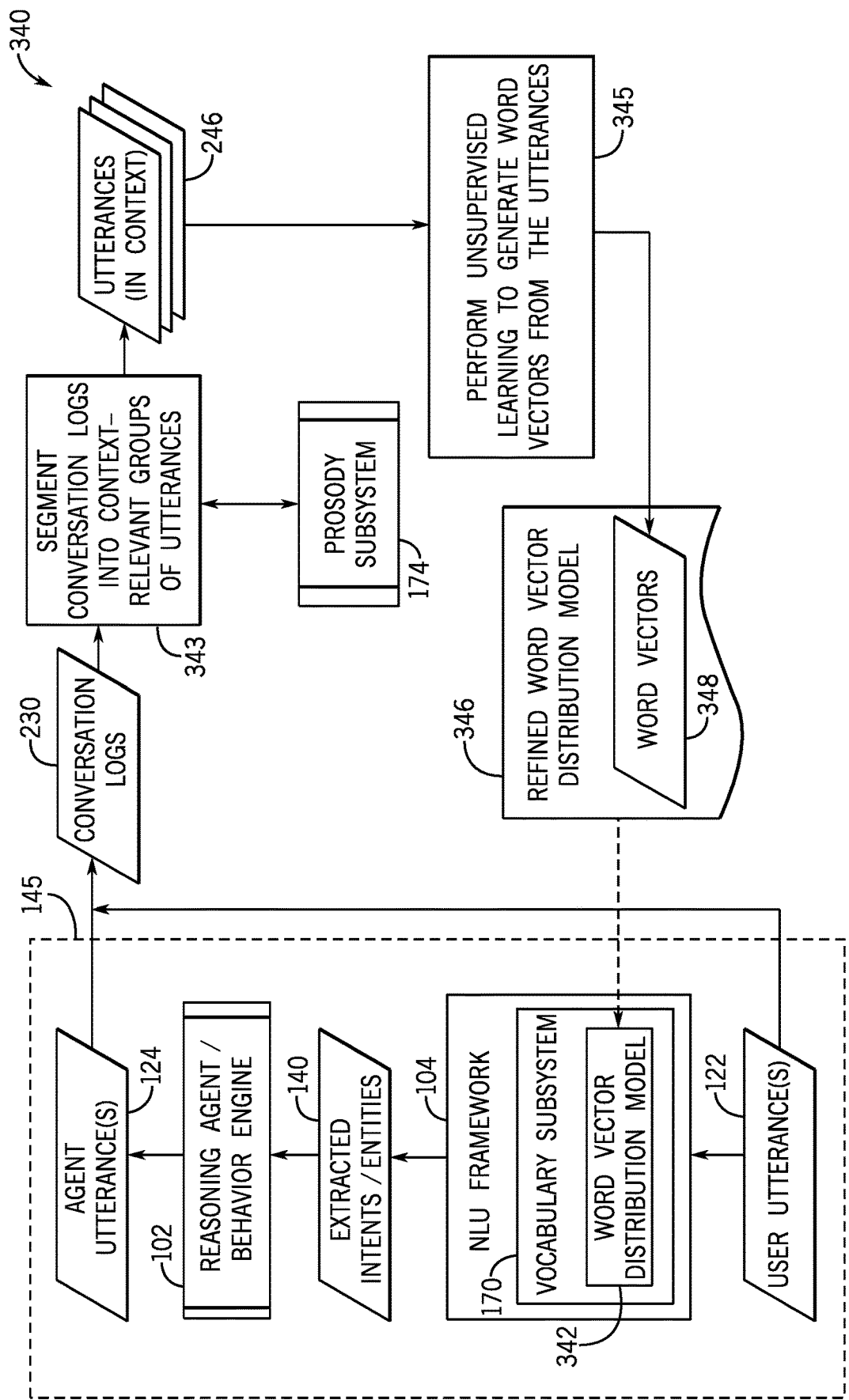
FIG. 12 is a block diagram illustrating an embodiment of a process by which the agent automation system continuously learns new words and/or refines word understanding for improved domain specificity, based on in-context utterances identified by the prosody subsystem, in accordance with aspects of the present technique.

For the embodiment illustrated in FIG. 12, prior to operation of the agent automation system 100, the word vector distribution model 342 may initially be generated based on a first corpus of utterances that have a particular diction and vocabulary, such as a set of books, newspapers, periodicals, and so forth. However, it is appreciated that many utterances exchanges in different conversational channels (e.g., chat rooms, forums, emails) may demonstrate different diction, such as slang terms, abbreviated terms, acronyms, and so forth. With this in mind, the continual learning loop illustrated in FIG. 12 enables the word vector distribution model 342 to be modified to include new word vectors, and to change values of existing word vectors, based on source data gleaned from the growing collections of user and agent utterances 122 and 124 in the conversation logs 230, to improve the domain specificity of the NLU framework 104.

It should be noted that word-vector learning is based on the premise that words are generally used in specific contexts, and this defines a probability that specific words will appear given a specific set of surrounding words or, conversely, a probability that surrounding words will appear given a certain word, or similar context-aware derivations. As such, it is presently recognized that word vectors should be learned using optimization functions related to context (e.g., where words are appropriately "couched" within the context of other words). As such, one important aspect of prosodic segmentation is determining when one context starts and when one context ends. That is, it may be appreciated that, in certain written language source data (e.g., online or news articles), context boundaries may be well-defined; however, other types of written language source data (e.g., free-form chat) these context boundaries may not be as readily apparent. As such, the disclosed prosody subsystem 174 determines these context boundaries to suitably group utterances in a context-specific manner, such that word meanings are extracted with the correct context specified.

Like FIG. 11, the process 340 illustrated in FIG. 12 includes receiving and responding to the user utterance 122, as discussed above with respect to FIG. 5. As mentioned, the user utterances 122 and the agent utterances 124 can be collected to as part of the conversation logs 230, which may form at least a portion of the corpus of utterance 112 stored in the database 106 illustrated in FIG. 4A. As some point, such as during regularly scheduled maintenance, the prosody subsystem 174 of the NLU framework 104 segments (block 343) the conversation logs 230 into distinct utterances 246, as discussed above with respect to FIG. 10. It should be noted that, because of the manner in which the conversation logs 230 are broken down into sessions 238 before being broken down into utterances 246, as noted above with respect to FIG. 10, the utterances 246 segmented in block 343 are grouped with similar context. For example, in certain embodiments, the utterances 246 generated in block 343 may be grouped based on the session 238 from which each of the utterances 246 are derived, such that each group of utterances 246 are likely to be contextually relevant to one another. Then, in block 345, the NLU framework 104 performs rule-augmented unsupervised learning to generate a redefined word vector distribution model 346 containing new or different word vectors 348 generated from the segmented utterances 344.

For example, as discussed above, the meaning extraction subsystem 150 may analyze the set of segmented utterances 344 and determine word vectors 348 for the words of these utterances based on how certain words tend to be used together. For such embodiments, two words that are frequently used in similar contexts within these utterances 344 are considered closely related and, therefore, are assigned a similar vector value (e.g., relatively closer in terms of Euclidean distance) in one or more dimensions of the word vectors 348. In this manner, the meaning extraction subsystem 150 may adapt to changes in the meaning of a previously understood term based on new context in which the term is used.

As illustrated in FIG. 12, the redefined word vector distribution model 346 is used to replace the existing word vector distribution model 342, such that the vocabulary subsystem 170 can use this redefined model to provide word vectors for the words and phrases of new user utterances 122 received by the agent automation system 100. For example, an initial word vector distribution model 342 may have a word vector for the term "Everest" that is relatively close in one or more dimensions to other word vectors for terms such as, "mountain", "Himalayas", "peak", and so forth. However, when a client creates a new conference room that is named "Everest," the term begins to be used in a different context within user utterances 122. As such, in block 345, a new word vector would be generated for the term "Everest" that would be relatively close in one or more dimensions to word vectors for terms such as "conference", "meeting", "presentation", and so forth. After updating the word vector distribution model, upon receiving a user utterance 122 having the revised term "Everest," the operation of the vocabulary subsystem 170, the NLU framework 104, and the agent automation system 100 is improved to more provide more accurate word vectors, annotated utterance trees, and meaning representations, which result in more accurately extracted intents/entities 140 for the given domain (e.g., enhanced domain specificity).

Figure 13:
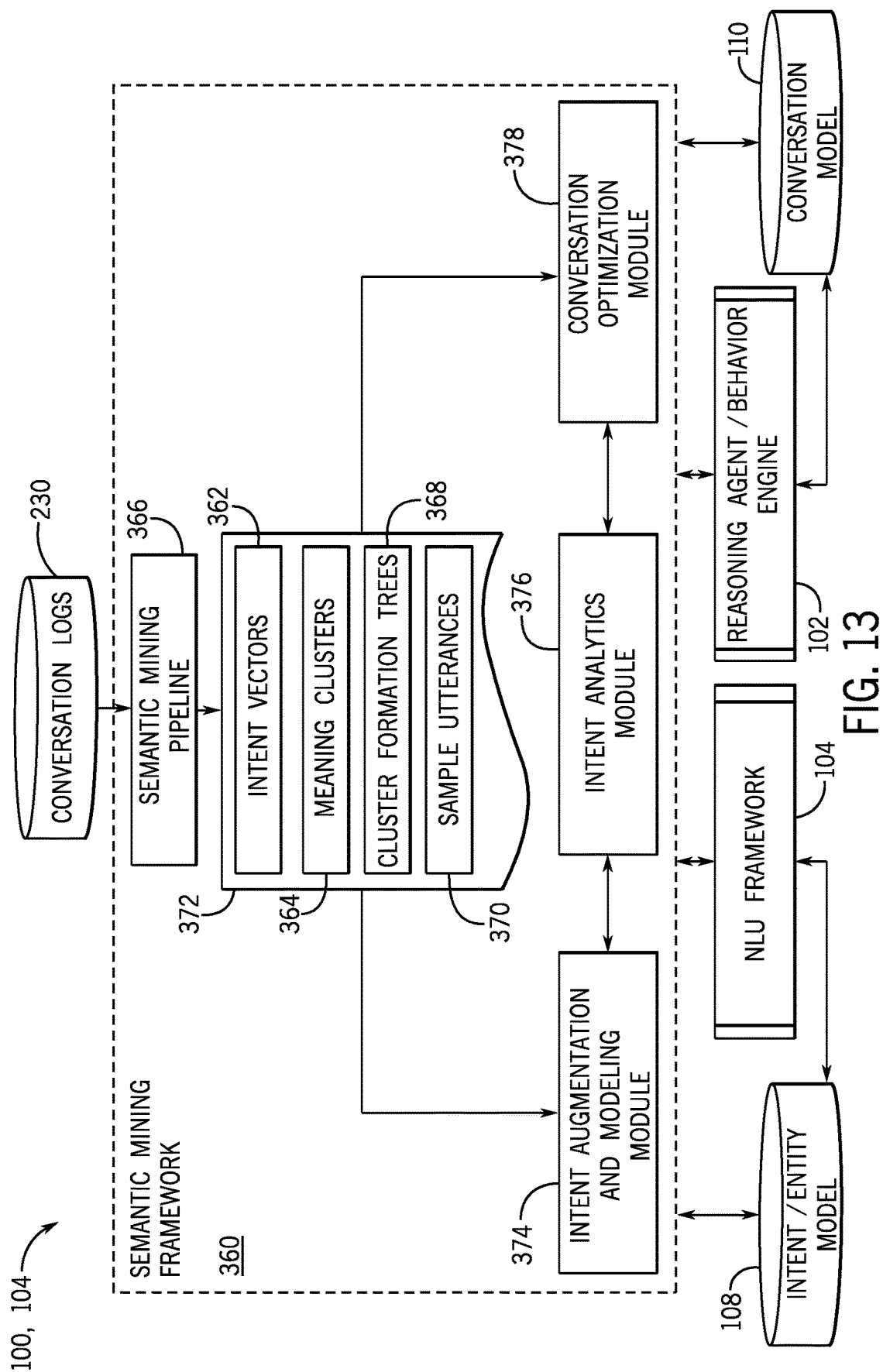
FIG. 13 is a block diagram depicting a high-level view of certain components of the agent automation framework, including a semantic mining framework, in accordance with aspects of the present technique.

As mentioned, the disclosed agent automation framework 100 is capable of generating a number of outputs, including the intent/entity model 108, based on the corpus of utterances 112 and the collection of rules 114 stored in the database 106. FIG. 13 is a block diagram depicting a high-level view of certain components of the agent automation framework 100, in accordance with an embodiment of the present approach. In addition to the NLU framework 104 and the reasoning agent/behavior engine 102 discussed above, the embodiment of the agent automation framework 100 illustrated in FIG. 13 includes a semantic mining framework 360 that is designed to process the conversation logs 230, using various subsystems of the NLU framework 104, to generate and improve the intent/entity model 108 and to improve the conversation model 110.

More specifically, for the illustrated embodiment, the semantic mining framework 360 includes a number of components that cooperate with other components of the agent automation framework 100 (e.g., the NLU framework 104, the vocabulary manager 118) to facilitate generation and improvement of the intent/entity model 108 based on the conversation logs 230, which may for at least part of the corpus of utterances 112 stored in the database 106. That is, as discussed in greater detail below, the semantic mining framework 360 cooperates with the NLU framework 104 to decompose utterances 112 into intent segments (e.g., intents and entities), and to map these to intent vectors 362 within a vector space. In certain embodiments, certain entities (e.g., intent-specific or non-generic entities) are handled and stored as parameterizations of corresponding intents of the intent vectors within the vector space. For example, in the utterance, "I want to buy the red shirt," the entity "the red shirt" is treated as a parameter of the intent "I want to buy," and can be mapped into the vector space accordingly. The semantic mining framework 360 also groups the intent vectors based on meaning proximity (e.g., distance between intent vectors in the vector space) to generate meaning clusters 364, as discussed in greater detail below with respect to FIG. 14, such that distances between various intent vectors 362 and/or various meaning clusters 364 within the vector space can be calculated by the NLU framework 104, as discussed in greater detail below.

For the embodiment illustrated in FIG. 13, the semantic mining framework 360 begins with a semantic mining pipeline 366, which is an application or engine that generates the aforementioned intent vectors 362, as well as suitable meaning clusters 364, to facilitate the generation of the intent/entity model 108 based on the conversation logs 230. For example, in certain embodiments, the semantic mining pipeline 136 provides all levels of possible categorization of intents found in the conversation logs 230. Additionally, the semantic mining pipeline 366 produces a navigable schema (e.g., cluster formation trees 368 and/or dendrograms) for intent and intent cluster exploration. As discussed below, the semantic mining pipeline 366 also produces sample utterances 370 that are associated with each meaning cluster, and which are useful to cluster exploration and training of the reasoning agent/behavior engine 102 and/or the conversation model 110. In certain embodiments, the outputs 372 of the semantic mining pipeline 366 (e.g., meaning clusters 364, cluster formation trees 368, sample utterances 370, and others discussed below) may be stored as part within one or more tables of the database 106 in any suitable manner.

Once the outputs 372 have been generated by the semantic mining pipeline 366, in certain embodiments, an intent augmentation and modeling module 374 may be executed to generate and improve the intent/entity model 108. For example, the intent augmentation and modeling module 374 may work in conjunction with other portions of the NLU framework 104 to translate mined intents into the intent/entity model 108. In particular, meaning clusters 364 may be used by the intent augmentation and modeling module 374 as a basis for intent definition. This follows naturally from the fact that meaning proximity is used as the basis for formation of the meaning clusters 364. As such, related and/or synonymous intent expressions are grouped together and, therefore, can be used as primary or initial samples for intents/entities when creating the intent/entity model 108 of the agent automation framework 100. Additionally, in certain embodiments, the intent augmentation and modeling module 374 utilizes a rules-based intent augmentation facility to augment sample coverage for discovered intents, which makes intent recognition by the NLU engine 116 more precise and generalizable. In certain embodiments, the intent augmentation and modeling module 374 may additionally or alternatively include one or more cluster cleaning steps and/or one or more cluster data augmentation steps that are performed based on the collection of rules 114 stored in the database 106. This augmentation may include a rule-based re-expression of sample utterances included in the discovered intent models and removal of structurally similar re-expressions/samples within the discovered model data. For example, this augmentation can include an active-to-passive re-expression rule, wherein a sample utterance "I chopped this tree" may be converted to "this tree was chopped by me". Additionally, since re-expressions (e.g., "buy this shoe" and "purchase this sneaker") have the same parse structure and similarly labeled parse node words that are effectively synonyms, this augmentation can also include removing such structurally similar re-expressions.

For the embodiment illustrated in FIG. 13, the semantic mining framework 360 includes an intent analytics module 376 that enables visualization of conversation log statistics, including intent and entity prevalence, and so forth. The illustrated embodiment also includes a conversation optimization module 378 that works in conjunction with the intent analytics module 376 to identify blind spots or weak points in the conversation model 110. For example, in an embodiment, the intent analytics module 376 may determine or infer intent prevalence values for certain intents based on cluster size (or another suitable parameter). Subsequently, intent prevalence values can be used by the conversation optimization module 378 as a measure of the popularity of queries that include particular intents. Additionally, when these intent prevalence values are compared to intents associated with particular responses in the conversation model 110, the conversation optimization module 378 may identify portions of the conversation model 110 that provide insufficient coverage (e.g., blind-spot discovery). That is, when the conversation optimization module 378 determines that a particular intent has a particularly high prevalence value and is not associated with a particular response in the conversation model 110, the conversation optimization module 378 may identify this deficiency (e.g., to a designer of the reasoning agent/behavior engine 102), such that suitable responses can be associated with these intents to improve the conversation model 110. Additionally, in certain embodiments, the intent analytics module 376 may determine a number of natural clusters within the meaning clusters 364, and the conversation optimization module 378 may compare this value to a number of breadth of intents associated with responses in the conversation model 110 to provide a measure of sufficiency of the conversation model 110 to address the intent vectors 362 generated by the semantic mining pipeline 366.

Figure 14:
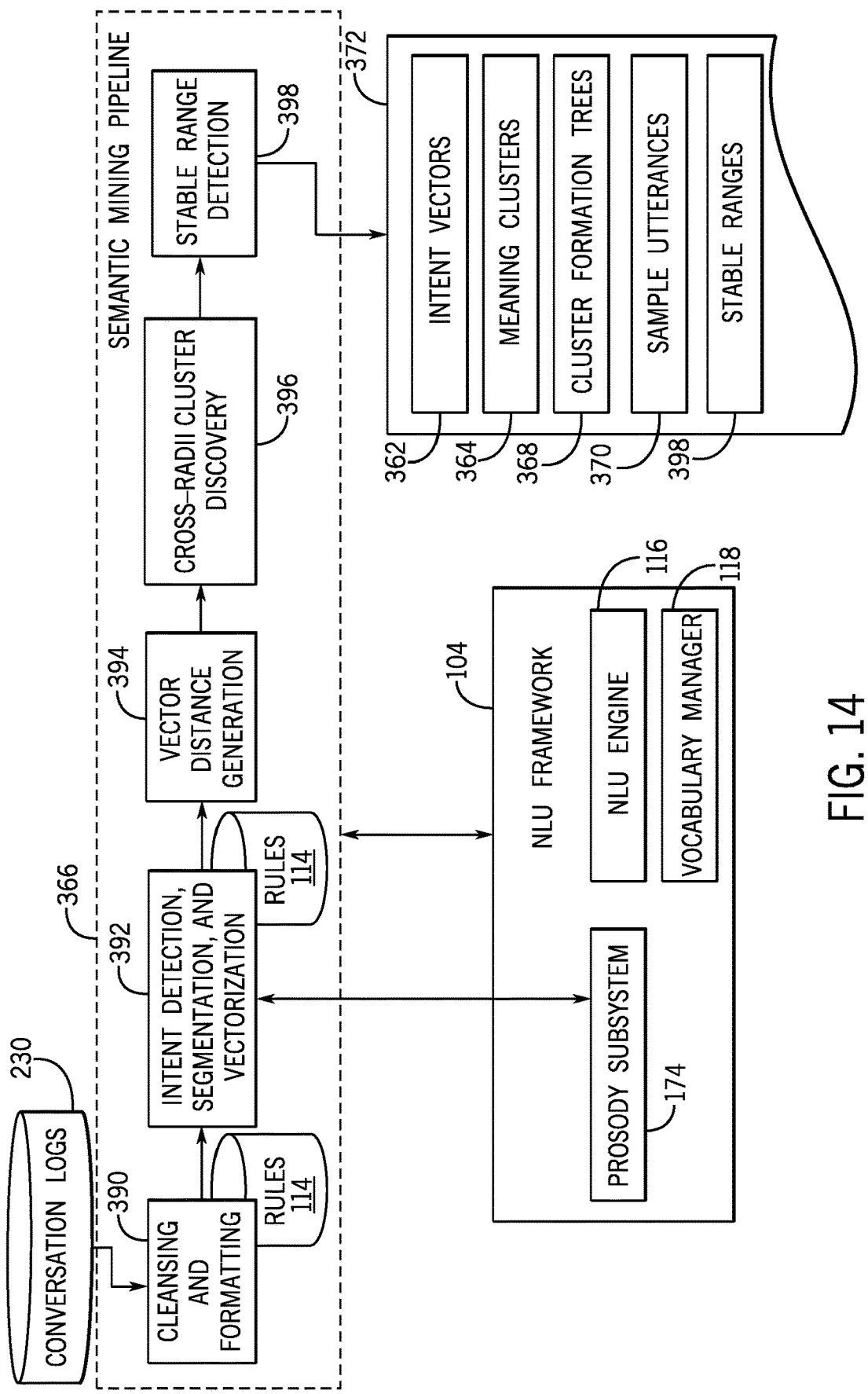
FIG. 14 is a block diagram of a semantic mining pipeline of the semantic mining framework illustrating a number of processing steps of a semantic mining process, in accordance with aspects of the present technique.

FIG. 14 is a block diagram of an embodiment of the semantic mining pipeline 136 that includes a number of processing steps of a semantic mining process used to generate outputs 372 to facilitate the generation of the intent/entity model 108 from the conversation logs 230. As such, the steps that are illustrated as part of the semantic mining pipeline 136 may be stored in suitable memory (e.g., memory 86) and executed by suitable a suitable processor (e.g., processor 82) associated with the client instance 42 (e.g., within the data center 22).

For the illustrated embodiment, the semantic mining pipeline 366 includes a cleansing and formatting step 390. During the cleansing and formatting step 390, the processor 82 analyzes the conversation logs 230 and removes or modifies any source data that may be problematic for intent mining, or to speed or facilitate intent mining. For example, the processor 82 may access rules 114 stored in the database 106 that define or specify particular features that should be modified within the corpus of utterances 112 before intent mining of the utterances 112 occurs. These features may include special characters (e.g., tabs), control characters (e.g., carriage return, line feed), punctuation, unsupported character types, uniform resource locator (URLs), internet protocol (IP) addresses, file locations, misspelled words and typographical errors, and so forth. In certain embodiments, the vocabulary manager 118 of the NLU framework 104 may perform at least portions of the cleansing and formatting step 390 to substitute out-of-vocabulary words based on synonyms and domain-specific meanings of words, acronyms, symbols, and so forth, defined with the rules 114 stored in the database 106.

For the illustrated embodiment, after cleansing and formatting, the conversation logs 230 undergo an intent detection, segmentation, and vectorization step 392. During this step, the processor 82 analyzes the conversation logs 230 using the NLU framework 104, including the NLU engine 116 and the vocabulary manager 118, to detect and segment the utterances into intents and entities based on the rules 114 stored in the database 106. Within this step, the prosody subsystem 174 of the NLU framework 104 is particularly responsible for repeatedly digesting the conversation logs 230 into intent segments 250, as discussed above with respect to FIG. 10. As mentioned above, the intent segments 250 may be generated from utterances 246 based on punctuation, based on CCG grammar form detection/recognition, or a combination thereof. Since these intent segments 250 form the basis for clustering intent vectors 362 during semantic mining, it is presently recognized that proper intent segmentation is important to the precise and domain specific operation of the NLU framework 104.

As discussed, in certain embodiments, certain entities can be stored in the intent/entity model 108 as parameters of the intents. Additionally, these intents are vectorized, meaning that a respective intent vector is produced for each intent by the NLU framework 104. It may be appreciated by those skilled in the art that these vectors may be generated by the NLU framework 104 in a number of ways. For example, in certain embodiments, the NLU framework 104 may algorithmically generate these vectors based on pre-built vectors in a database (e.g., a vector for an intent "buy a shoe" might include a pre-built vector for "buy" that is modified to account for the "shoe" parameter). In another embodiment, these vectors may be based on the output of an encoder portion of an encoder-decoder pair of a language translation system that consumes the intents as inputs.

For the illustrated embodiment, after intent detection, segmentation, and vectorization, a vector distance generation step 394 is performed. During this step, all of the intent vectors produced in block 392 are processed to calculate distances between all intent vectors (e.g., as a two-dimensional matrix). For example, the processor 82 executes a portion of the NLU framework 104 (e.g., the NLU engine 116) that calculates the relative distances (e.g., Euclidean distances, or another suitable measure of distance) between each intent vector in the vector space to generate this distance matrix, which is later used for cluster formation, as discussed below.

For the illustrated embodiment, after vector distance generation, a cluster discovery step 396 is performed. In certain embodiments, this may be a cross-radii cluster discovery process; however, in other embodiments, other cluster discovery processes can be used, including, but not limited to, agglomerative clustering techniques (e.g., Hierarchical Agglomerative Clustering (HAC)), density based clustering (e.g., Ordering Points To Identify the Clustering Structure (OPTICS)), and combinations thereof, to optimize for different goals. For example, discussion cluster discovery may more benefit from density-based approaches, such as OPTICS, while intent model discovery may benefit more from agglomerative techniques, such as HAC.

For example, in one embodiment involving a cross-radii cluster discovery process, the processor 82 attempts to identify a radius value that defines a particular cluster of intent vectors in the vector space based on the calculated vector distances. The processor 82 may determine a suitable radius value defining a sphere around each intent vector, wherein each sphere contains a cluster of intent vectors. For example, the processor 82 may begin at a minimal radius value (e.g., a radius value of 0), wherein each intent vector represents a distinct cluster (e.g., maximum granularity). The processor 82 may then repeatedly increment the radius (e.g., up to a maximum radium value), enlarging the spheres, while determining the size of (e.g., the number of intent vectors contained within) each cluster, until all of the intent vectors and meaning clusters merge into a single cluster at a particular maximum radius value. It may also be appreciated that the disclosed cross-radii cluster discovery process represents one example of a cluster discovery process, and in other embodiments, cluster discovery may additionally or alternatively incorporate measures and targets for cluster density, reachability, and so forth.

For the illustrated embodiment, after cluster discovery, a stable range detection step 398 is performed. For example, for embodiments that utilize the cross-radii cluster discovery process discussed above, the processor 82 analyzes the radius values relative to the cluster sizes determined during cluster discovery 396 to identify stable ranges 398 of radius values, indicating that natural clusters are being discovered within the vector space. Such natural intent clusters are commonly present within a corpus of utterances, and are generally particular to a language and/or a context/domain.

Additionally, the prosody subsystem 174 also supports and enables episodic context management within the agent automation system 100. For example, in certain embodiments, the RA/BE 102 may include a number of different personas, each designed to address different aspects or facets of the behavior of the RA/BE 102, such as a sales persona, a marketing persona, a support persona, a persona for addressing requests during business hours, a persona for addressing requests after business hours, and so forth. Additionally, these personas of the RA/BE 102 manage context information associated with each episode, wherein the context information may be stored as a hierarchical set of name/value pairs in the database 106. As such, the RA/BE 102 ensures that appropriate episodic context information can be applied when responding to user messages.

For example, in certain embodiments, a persona of the RA/BE 102 may initially respond to a user message based on a current context that only includes context information from the current episode (e.g., today's episode context). However, when the prosody subsystem 174 determines that a user message includes prosodic cues indicating that the user message is associated with the context information of another episode (e.g., yesterday's context), the RA/BE 102 responds by retrieving and overlaying the context information of the current episode with the context of the referenced episode based on persona-specific overlay rule templates, which may be stored in the database 106. As such, the persona of the RA/BE 102 can subsequently perform suitable actions in response to the user message, as well as subsequent user message, in a context-appropriate manner. Accordingly, the disclosed RA/BE 102 design provides a substantial improvement by enabling virtual agents having automatic context management.

Figure 15:
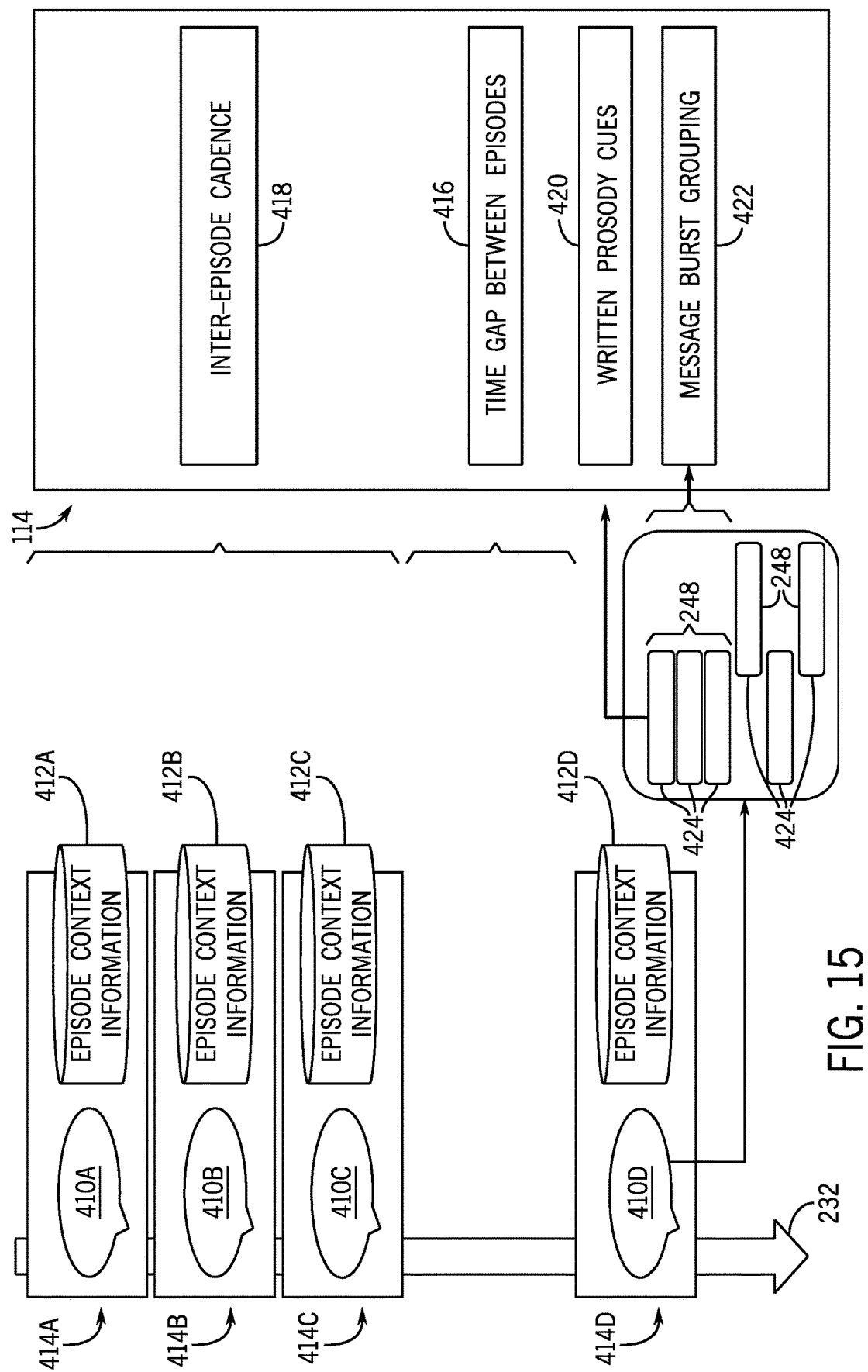
FIG. 15 is a diagram illustrating the prosody subsystem supporting the RA/BE in segmenting episodic context information from conversation logs, in accordance with aspects of the present technique.

For the illustrated example of FIG. 15, the RA/BE 102 manages information for a number of different episodes in one or more suitable tables of the database 106. More specifically, a particular persona of the RA/BE 102 manages episode conversation information 410 (e.g., episode conversation information 410A, 410B, 410C, and 410D), which includes messages and corresponding metadata that are part of each episode of conversation between the user and the persona of the RA/BE 102. Additionally, the persona of the RA/BE 102 manages episode context information 412 (e.g., episode context information 412A, 412B, 412C, and 412D), which includes name/value pairs storing details (e.g., user information, topic information, prices, stock identifiers, weather information, and so forth) relating to the episode of conversation.

For the illustrated example, the persona of the RA/BE 102 calls on the prosody subsystem 174 of the NLU framework 104 to determine how to segment a conversation into episodes 414, including episodes 414A, 414B, 414C, and 414D, which represent discrete or disparate portions of the conversation logs 230 (indicated by the conversation timeline 232 in FIG. 15) that are pertinent to a specific topic/set of topics during one-on-one or group interactions involving the RA/BE 102. It may be noted that, in certain embodiments, these episodes 414 correspond to sessions 238 or segments 242 that are identified from the conversation logs 230 by the prosody subsystem 174, as illustrated in FIG. 10, while in other embodiments, each of the episodes 414 can include messages from different sessions 283 and/or segments 242 that are topically related, based on written prosodic cues, and/or temporally related, based on temporal prosodic cues. For the illustrated example of FIG. 15, each of the episodes 414 corresponds to a particular session 240, which includes respective boundaries to mark start and end times that are determined from the conversation log 230 as the conversation progresses. To identify these boundaries, the prosody subsystem 174 may apply rules and/or statistical learning (e.g., machine-learning) techniques to determine how to divide and group messages from the conversation log 230 to support episodic context management by the RA/BE 102.

For example, in certain embodiments, the prosody subsystem 174 determines the start and end time associated with each of the episodes 414 based on written prosodic cues that indicate changes in topic, based on temporal prosodic cues that indicate a substantially delay between messages, or other suitable factors. Specifically, in certain embodiments, the prosody subsystem 174 may use heuristic rules to identify episode start and end times. Learning mechanisms, similar to human autonoetic introspection, can be used to determine approximations of attention span, identify what context information 412 needs to be propagated across episode boundaries, determine property-override-rules, determine derivative scoping rules, and so forth, and these, in turn, use features of the user (e.g., user demographic, user mood, and so forth) alongside current relevant context (e.g., current time-of-day, location, weather, and so forth).

For the illustrated embodiment, the prosody subsystem 174 may use the rules 114 stored in the database 106 to digest the conversation log 230 represented by the conversation timeline 232 into sessions 238, wherein each session 240 corresponds to one of the episodes 414. For example, in certain embodiments, the rules 114 may define a time gap 416 between episodes 414, such that an amount of time between messages in the conversation log 230 that is greater than or equal to this stored threshold value indicates the end of a first episode (e.g., episode 414A) and the beginning of the next episode (e.g., episode 414B). In certain embodiments, the rules 114 may additionally or alternatively define an inter-episode cadence 418, which defines a length of time or a number of messages along the conversation timeline 232 that generally corresponds to a single episode, such that a duration or a number of messages of a conversation can be used as an indication of demarcation between episodes 414. In certain embodiments, the rules 114 may also define written prosodic cues 420 (also referred to as per-utterance cues), which are written prosodic cues within the messages of the conversation logs 230 that may signal the beginning or end of an episode. Additionally, in certain embodiments, the rules 114 may also define message burst grouping 422, which indicates how certain distinct messages 424 within the conversation logs 230 may be combined by the prosody subsystem 174 to represent a single utterance 248 based on temporal and/or written prosodic cues. As noted above, in certain embodiments, this may involve the prosody subsystem 174 matching utterance trees of the messages 424 and/or utterances 248 to predetermined CCG forms representing phrases that are indicative of topic changes (e.g., "Now, with regards to . . . ", "Speaking of which . . . ", "Going back to . . . ", and so forth) to determine which messages 424 should be treated as a single utterance 248.

However, as mentioned, in certain embodiments, the prosody subsystem 174 may be or include a ML-based prosody system 196, which learns how to digest the conversation log 230 into episodes 414 based on different prosodic cues. For example, in certain embodiments, the ML-based prosody system 196 may analyze the conversation log 230 to determine the inter-episode cadence 418 for a set of conversation logs 230. Additionally, the ML-based prosody system 196 may analyze the conversation logs 230 to determine the typical time gap 416 between episodes 414 based on temporal prosodic cues. The ML-based prosody system 196 may also analyze written prosodic cues in the conversation logs 230 to determine written prosodic cues 420 that signal the beginning or end of an episode. The ML-based prosody system 196 may further analyze temporal prosodic cues in the conversation logs 230 to determine the message burst grouping 422, which dictates how the ML-based prosody system 196 groups messages 424 within the episodes 414 as a distinct utterance 248. In certain embodiments, the conversation logs 230 may be further annotated by a human to indicate when the human believes that the episodic boundaries should occur to enhance learning by the ML-based prosody system 196.

Figure 16:
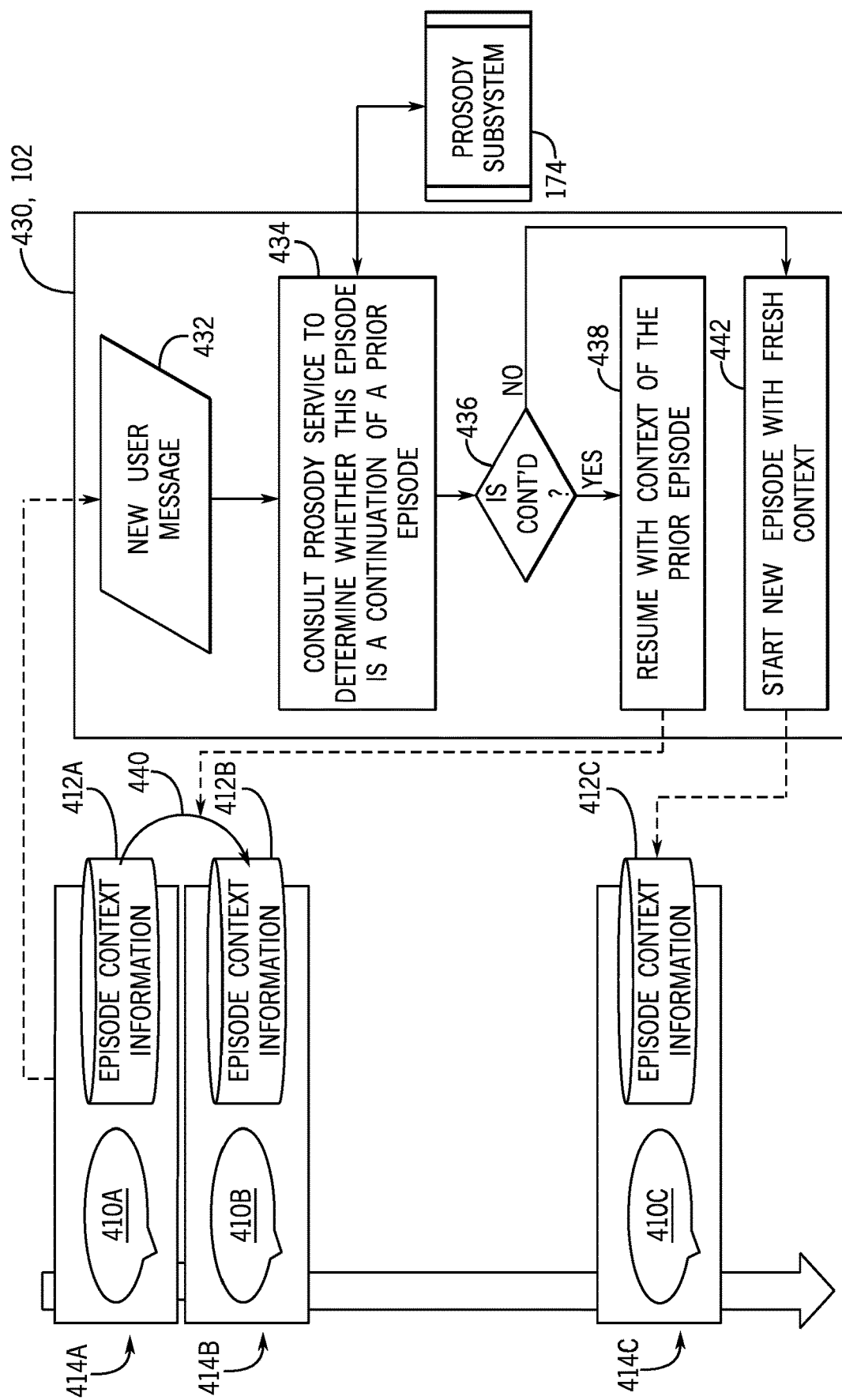
FIG. 16 is a flow diagram illustrating how a persona of the RA/BE uses the prosody subsystem to manage episodic context within the agent automation framework, in accordance with aspects of the present technique.

FIG. 16 is a flow diagram depicting an example of a persona 430 of a RA/BE 102 using the prosody subsystem 174 of the NLU framework 104 to manage episodic conversation context, in accordance with an embodiment of the present approach. For the illustrated embodiment, the persona 430 is a script of the RA/BE 102 that is designed to address a particular aspect of conversations with user, such sales persona, a marketing persona, a support persona. Additionally, the persona 430 of the RA/BE 102 stores and manages context information 412 (e.g., context information 412A, 412B, and 412C) that is associated with each distinct chat episode 414 between the user and the persona 430, wherein the context information 412 may be stored as a hierarchical set of name/value pairs in the database 106. For example, stored context information 412 may include user information (e.g., role, gender, age), conversational topic information (e.g., items discussed, actions requested), and other conversational details (e.g., results/outcomes) for each episode of conversation between the user and the persona 430.

When the persona 430 of the RA/BE 102 receives a new message 432 from the user, the persona 430 consults the prosody subsystem 174 (block 434) to determine (block 436) whether the new message should be treated as a continuation of a prior conversation episode (e.g., chat episode) or the beginning of a new episode. As set forth above with respect to FIG. 15, in certain embodiments, the prosody subsystem 174 may include a rules-based prosody system 194 that applies rules 114 stored in the database 106 to determine whether the new message 432 is a continuation of a prior chat episode. For example, the rules-based prosody system 194 may apply a rule that defines the typical time gap 416 between episodes, and when the time gap between the new message 432 and the previous message in the conversation logs 230 is less than the typical time gap 416, the rules-based prosody system 194 may determine that the new message 432 is a continuation of the previous episode. In other embodiments, the rules-based prosody system 194 may apply a rule that defines written prosodic cues 420 that signal the start of a new episode or that signal that the new message 432 is a continuation of a prior episode. In still other embodiments, the prosody subsystem 174 may include a ML-based prosody system 196 that learns from the conversation logs 230 the typical time gap 416 between episodes and/or written prosodic cues 420 that are then applied to determine whether the new message 432 is a continuation of a prior episode.

When the persona 430 of the RA/BE 102 determines that the prosody subsystem 174 has provided an indication that the new message 432 is a continuation of a prior episode, the RA/BE 102 responds resuming (block 438) the conversation using the context of the prior episode. To do this, as illustrated by the arrow 440, the RA/BE 102 overlays the episode context information of the prior episode (e.g., episode context information 412A) over the current context information (e.g., episode context information 412B) in order to use at least a portion of the context information of the prior episode when responding to the new user message 432. In certain embodiments, the prosody subsystem 174 may additionally provide the persona 430 with intent segments (e.g., intents/entities) that are identified within the new user message 432, such that the persona 430 can identify context-overlay cues within these intent segments and use these context-overlay cues to identify which prior episode context information should be overlaid. One example of a context-overlay cue in a message might be, "Remember what we discussed on Wednesday?" Additionally, the persona 430 of the RA/BE 102 may be programmed to perform particular actions in response to particular intents/entities parsed from the new user message 432 by the prosody subsystem 174.

In certain embodiments, overlaying may involve the persona 430 of the RA/BE 102 applying persona-specific overlay rule templates stored in the database 106 that define how the hierarchical set of name/value pairs of the context information associated with the prior episode augments or modifies the context information associated with the current conversation with the user. In certain embodiments, this may also involve the RA/BE 102 combining the context information of multiple episodes based on person-specific multi-episode aggregation rules stored in the database 106. However, when the prosody subsystem 174 signals to the RA/BE 102 that the new message 432 is not a continuation of a prior episode, the persona 430 of the RA/BE 102 starts (block 442) a new episode with fresh context (e.g., episode context information 412C) without overlaying context information of another episode. As such, the persona 430 of the RA/BE 102 can subsequently perform suitable actions in response to the new user message 432, as well as subsequent user messages of the current episode, in a context-appropriate manner.

Technical effects of the present disclosure include providing an agent automation framework that is capable of extracting meaning from user utterances, such as requests received by a virtual agent (e.g., a chat agent), and suitably responding to these user utterances. Additionally, present embodiment include a prosody subsystem of the NLU framework that is designed to analyze collections of written messages for various prosodic cues to break down the collection into a suitable level of granularity (e.g., into episodes, sessions, segments, utterances, and/or intent segments) for consumption by other components of the NLU framework, enabling operation of the NLU framework. These prosodic cues may include, for example, source prosodic cues that are based on the author and the conversation channel associated with each message, temporal prosodic cues that are based on a respective time associated with each message, and/or written prosodic cues that are based on the content of each message. For example, to improve the domain specificity of the agent automation system, intent segments extracted by the prosody subsystem may be consumed by a training process for a ML-based structure subsystem of the NLU framework, and contextually-relevant groups of utterances extracted by the prosody subsystem may be consumed by another training process that generates new word vector distribution models for a vocabulary subsystem of the NLU framework. Additionally, intent segments extracted by the prosody subsystem may be consumed by a semantic mining framework of the NLU framework to generate an intent/entity model that is used for later intent extraction. Additionally, to enable episodic context management within the NLU framework, the prosody subsystem may also analyze a received user message and provide an indication as to whether the user message corresponds to a prior episodes or corresponds to a new episode.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method of operating a natural language understanding (NLU) framework, comprising:
   receiving, via a prosody subsystem of the NLU framework, a conversation log comprising a plurality of written messages;
   dividing, via the prosody subsystem, a subset of the conversation log into a plurality of sessions based at least in part on temporal prosodic cues of the plurality of written messages, written prosodic cues of the plurality of written messages, a threshold delay stored in a database, a threshold number of messages stored in the database, or any combination thereof, the temporal prosodic cues indicating whether a delay between written messages of the plurality of written messages exceeds the threshold delay, whether a number of written messages sent within a time window exceeds the threshold number of messages, or both;
   dividing, via the prosody subsystem, each of the plurality of sessions into a plurality of conversation segments based at least in part on the temporal prosodic cues of the plurality of written messages, the written prosodic cues of the plurality of written messages, or any combination thereof; and
   providing the plurality of sessions, the plurality of conversation segments, or any combination thereof, to a behavior engine of the NLU framework, wherein the behavior engine is configured to generate episodic context information based on the plurality of sessions, the plurality of conversation segments, or the combination thereof.

2. The method of claim 1, comprising:
   dividing each of the plurality of conversation segments into a plurality of utterances based at least in part on the temporal prosodic cues of the plurality of written messages, the written prosodic cues of the plurality of written messages, or any combination thereof.

3. The method of claim 2, comprising:
   providing the plurality of utterances to a training process of a vocabulary subsystem of the NLU framework, wherein, within the training process, the plurality of utterances is used to generate a plurality of word vectors of a refined word vector distribution model that replaces a word vector distribution model of the vocabulary subsystem, wherein the NLU framework is configured to use the refined word vector distribution model to determine word vectors for words of received natural language requests.

4. The method of claim 2, comprising:
   dividing each of the plurality of utterances into a plurality of intent segments based at least in part on the temporal prosodic cues of the plurality of written messages, the written prosodic cues of the plurality of written messages, or any combination thereof.

5. The method of claim 4, comprising:
   providing the plurality of intent segments to a training process of a machine-learning (ML)-based parser of the NLU framework, wherein, within the training process, the NLU framework applies a plurality of other parsers of the NLU framework to generate a plurality of utterance trees for each intent segment, and in response to determining that a majority of the plurality of utterance trees for a particular intent segment are the same utterance tree, update a model of the ML-based parser such that the ML-based parser generates the same utterance tree for the particular intent segment.

6. The method of claim 4, comprising:
   providing the plurality of intent segments to a semantic mining pipeline of the NLU framework, wherein the semantic mining pipeline performs actions comprising:
   generating intent vectors for each of the plurality of intent segments;
   generating meaning clusters of intent vectors based on distances between the intent vectors;
   detecting stable ranges of cluster radius values for the meaning clusters; and
   generating an intent/entity model from the meaning clusters and the stable ranges of cluster radius values, wherein the intent/entity model stores relationships between a representative intent of each of the meaning clusters and corresponding intent segments as sample utterances, and wherein the NLU framework is configured to use the intent/entity model to classify intents of received natural language requests.

7. The method of claim 1, comprising:
   dividing, via the prosody subsystem, the conversation log into one or more conversation channel groups based on a conversational medium associated with each the plurality of written messages, wherein the subset of the conversation log corresponds to the one or more conversation channel groups.

8. The method of claim 1, wherein, to generate the episodic context information, the behavior engine generates an episode frame tree set in a persona context database of a persona of the behavior engine based at least in part on the plurality of sessions, the plurality of conversation segments, or the combination thereof.

9. The method of claim 8, wherein the episode frame tree set comprises an episode start time and an episode end time that are heuristically determined from plurality of sessions, the plurality of conversation segments, or the combination thereof.

10. The method of claim 1, wherein the temporal prosody cues are determined based on a respective time associated with each of the plurality of written messages of the conversation log.

11. The method of claim 1, wherein the written prosodic cues are determined based on punctuation, emojis, emphasis, or linguistic structure, or any combination thereof, within each of the plurality of written messages of the conversation log.

12. An agent automation system, comprising:
at least one memory configured to store a conversation log including a plurality of written messages, and to store a natural language understanding (NLU) framework including a prosody subsystem and a vocabulary subsystem; and
at least one processor configured to execute instructions of the NLU framework to cause the agent automation system to perform actions comprising:
dividing, via a prosody subsystem of the NLU framework, a subset of the conversation log into a plurality of utterances based at least in part on temporal prosodic cues of the plurality of written messages, a threshold delay stored in a database, a threshold number of messages stored in the database, written prosodic cues of the plurality of written messages, or any combination thereof, the temporal prosodic cues indicating whether a delay between written messages of the plurality of written messages exceeds the threshold delay, whether a number of written messages sent within a time window exceeds the threshold number of messages, or both; and
providing the plurality of utterances to a training process of the vocabulary subsystem, wherein, within the training process, the plurality of utterances is used to generate a plurality of word vectors of a refined word vector distribution model that replaces a word vector distribution model of the vocabulary subsystem, wherein the NLU framework is configured to use the refined word vector distribution model to determine word vectors for words of received natural language requests, the word vectors corresponding to semantic meanings of the words.

13. The system of claim 12, wherein the at least one processor is configured to execute the instructions of the NLU framework to cause the agent automation system to perform actions comprising:
dividing, via the prosody subsystem, the conversation log into one or more conversation channel groups based on a conversational medium associated with each written message of the conversation log;
dividing, via the prosody subsystem of the NLU framework, each of the one or more conversation channel groups into a plurality of sessions based at least in part on the temporal prosodic cues of the plurality of written messages, the written prosodic cues of the plurality of written messages, or any combination thereof; and
dividing, via the prosody subsystem, each of the plurality of sessions into a plurality of conversation segments based at least in part on the temporal prosodic cues of the plurality of written messages, the written prosodic cues of the plurality of written messages, or any combination thereof, or any combination thereof, wherein the subset of the conversation log corresponds to the plurality of conversation segments.

14. The system of claim 13, wherein the at least one processor is configured to execute the instructions of the NLU framework to cause the agent automation system to perform actions comprising:
providing the plurality of sessions, the plurality of conversation segments, or any combination thereof, to a persona of a behavior engine of the NLU framework, wherein behavior engine is configured to generate an episode frame tree set in a persona context database of the persona based on each of the plurality of sessions, the plurality of conversation segments, or the combination thereof, wherein the episode frame tree set comprises an episode start time and an episode end time that are heuristically determined from the plurality of sessions, the plurality of conversational segments, or the combination thereof.

15. The system of claim 12, wherein the at least one processor is configured to execute the instructions of the NLU framework to cause the agent automation system to perform actions comprising:
dividing, via the prosody subsystem, each of the plurality of utterances into a plurality of intent segments based at least in part on the temporal prosodic cues of the plurality of written messages, the written prosodic cues of the plurality of written messages, or any combination thereof;
providing the plurality of intent segments to a training process of a machine-learning (ML)-based parser of the NLU framework to update a model of the ML-based parser; and
providing the plurality of intent segments to a semantic mining pipeline of the NLU framework to generate an intent/entity model of the NLU framework, wherein the NLU framework is configured to use the intent/entity model to classify intents of received natural language requests.

16. A non-transitory, computer-readable medium storing a conversation log having a plurality of written messages and storing instructions of a natural language understanding (NLU) framework executable by one or more processors of a computing system, the instructions comprising instructions to:
divide, via a prosody subsystem of the NLU framework, a subset of the conversation log into a plurality of sessions based at least in part on temporal prosodic cues of the plurality of written messages, written prosodic cues of the plurality of written messages, a threshold delay stored in a database, a threshold number of messages stored in the database, or any combination thereof, the temporal prosodic cues indicating whether a delay between written messages of the plurality of written messages exceeds the threshold delay, whether a number of written messages sent within a time window exceeds the threshold number of messages, or both;
divide, via the prosody subsystem, each of the plurality of sessions into a plurality of intent segments based at least in part on temporal prosodic cues of the plurality of written messages, written prosodic cues of the plurality of written messages, or any combination thereof;
provide the plurality of intent segments to a training process of a machine-learning (ML)-based parser of the NLU framework to update a model of the ML-based parser; and
provide the plurality of intent segments to a semantic mining pipeline of the NLU framework to generate an intent/entity model of the NLU framework, wherein the NLU framework is configured to use the intent/entity model to classify intents of received natural language requests.

17. The non-transitory, computer-readable medium of claim 16, wherein the instructions comprise instructions to:
divide, via the prosody subsystem, the conversation log into one or more conversation channel groups based on a conversational medium associated with each of the plurality of written messages of the conversation log;

divide, via the prosody subsystem, each of the one or more conversation channel groups into the plurality of sessions based at least in part on the temporal prosodic cues of the plurality of written messages, the written prosodic cues of the plurality of written messages, or any combination thereof;

divide, via the prosody subsystem, each of the plurality of sessions into a plurality of conversation segments based at least in part on the temporal prosodic cues of the plurality of written messages, the written prosodic cues of the plurality of written messages, or any combination thereof; and divide, via the prosody subsystem, each of the plurality of conversation segments into a plurality of utterances based at least in part on the temporal prosodic cues of the plurality of written messages, the written prosodic cues of the plurality of written messages, or any combination thereof, wherein the subset of the conversation log is the plurality of utterances.

18. The non-transitory, computer-readable medium of claim 17, wherein the instructions comprise instructions to:

provide the plurality of sessions, the plurality of conversation segments, or any combination thereof, to a persona of a behavior engine of the NLU framework, wherein behavior engine is configured to generate an episode frame tree set in a persona context database of the persona based on each of the plurality of sessions, the plurality of conversation segments, or the combination thereof, wherein the episode frame tree set comprises an episode start time and an episode end time that are heuristically determined from the plurality of sessions, the plurality of conversational segments, or the combination thereof.

19. The non-transitory, computer-readable medium of claim 16, wherein the instructions comprise instructions to:

within the training process of the ML-based parser, apply a plurality of other parsers of the NLU framework to generate a plurality of utterance trees for each intent segment, and in response to determining that a majority of the plurality of utterance trees for a particular intent segment are the same utterance tree, update the model of the ML-based parser such that the ML-based parser generates the same utterance tree for the particular intent segment.

20. The non-transitory, computer-readable medium of claim 16, wherein the instructions comprise instructions for the semantic pipeline to:

in response to receiving the plurality of intent segments:
  generate intent vectors for each of the plurality of intent segments;
  generate meaning clusters of intent vectors based on distances between the intent vectors;
  detect stable ranges of cluster radius values for the meaning clusters; and
  generate the intent/entity model from the meaning clusters and the stable ranges of cluster radius values, wherein the intent/entity model stores relationships between a representative intent of each of the meaning clusters and corresponding intent segments as sample utterances.

* * * * *